(12) United States Patent
Dong et al.

(10) Patent No.: US 11,624,565 B2
(45) Date of Patent: Apr. 11, 2023

(54) HEADER BOX AND HEAT EXCHANGER

(71) Applicant: HANGZHOU SANHUA RESEARCH INSTITUTE CO., LTD., Hangzhou (CN)

(72) Inventors: Junqi Dong, Hangzhou (CN); Jianhua Gao, Hangzhou (CN); Shijiang Geng, Hangzhou (CN); Xuebin Fan, Hangzhou (CN)

(73) Assignee: HANGZHOU SANHUA RESEARCH INSTITUTE CO., LTD., Hangzhou (CN)

( * ) Notice: Subject to any disclaimer, the term of this patent is extended or adjusted under 35 U.S.C. 154(b) by 139 days.

(21) Appl. No.: 16/964,926

(22) PCT Filed: May 24, 2019

(86) PCT No.: PCT/CN2019/088400
§ 371 (c)(1),
(2) Date: Jul. 24, 2020

(87) PCT Pub. No.: WO2019/223797
PCT Pub. Date: Nov. 28, 2019

(65) Prior Publication Data
US 2021/0041189 A1    Feb. 11, 2021

(30) Foreign Application Priority Data

May 25, 2018 (CN) .......................... 201810517644.6
May 25, 2018 (CN) .......................... 201810517647.X
(Continued)

(51) Int. Cl.
*F28F 9/02* (2006.01)
*F28D 9/00* (2006.01)

(52) U.S. Cl.
CPC .......... *F28F 9/0207* (2013.01); *F28D 9/0093* (2013.01); *F28F 9/0278* (2013.01)

(58) Field of Classification Search
CPC ...... F28F 9/0278; F28F 9/0207; F28D 9/0093
See application file for complete search history.

(56) References Cited

U.S. PATENT DOCUMENTS

| | | | |
|---|---|---|---|
| 5,295,532 A * | 3/1994 | Hughes | F28D 1/05391 165/173 |
| 5,415,223 A | 5/1995 | Reavis et al. | |
| 7,418,999 B2 * | 9/2008 | Takano | F28F 9/0204 165/110 |
| 9,103,598 B2 * | 8/2015 | Bellenfant | F28D 1/0408 |
| 10,281,223 B2 * | 5/2019 | Hofmann | F28F 9/0224 |

(Continued)

FOREIGN PATENT DOCUMENTS

| | | |
|---|---|---|
| CN | 105593603 A | 5/2016 |
| CN | 107687787 A | 2/2018 |

(Continued)

OTHER PUBLICATIONS

Translation of DE10020763A1 entitled TRANSLATION-DE10020763A1 (Year: 2000).*

*Primary Examiner* — Paul Alvare
(74) *Attorney, Agent, or Firm* — Cheng-Ju Chiang

(57) ABSTRACT

A header box includes a first bottom plate and an unperforated cover plate. The first bottom plate includes a first surface and a second surface opposite to the first surface. The first bottom plate is of a one-piece configuration. The first surface is recessed inwardly to form a straight first hole extending along a length direction. The second surface is recessed inwardly to form at least two straight second holes extending along a width direction perpendicular to the length direction. The first hole is communicated with the at least two second holes. The cover plate is connected to the first surface to block an opening of the first hole on the first surface. A heat exchanger having the header box is also disclosed.

10 Claims, 42 Drawing Sheets

(30) Foreign Application Priority Data

May 25, 2018 (CN) .......................... 201810517648.4
Jun. 5, 2018 (CN) .......................... 201810569282.5

(56) References Cited

U.S. PATENT DOCUMENTS

| | | | |
|---|---|---|---|
| 2003/0188857 A1 | 10/2003 | Kawakubo et al. | |
| 2007/0056720 A1* | 3/2007 | Demuth | F28F 9/0278 |
| | | | 165/158 |
| 2007/0131398 A1 | 6/2007 | Ichiyanagi et al. | |
| 2007/0251682 A1* | 11/2007 | Sasaki | F28D 1/0391 |
| | | | 165/178 |
| 2015/0300758 A1* | 10/2015 | Hofmann | F28F 9/0224 |
| | | | 165/173 |

FOREIGN PATENT DOCUMENTS

| | | | | |
|---|---|---|---|---|
| DE | 10020763 A1 * | 11/2000 | ........... | F28D 1/0535 |
| EP | 2026028 A2 | 2/2009 | | |
| EP | 2060866 A1 * | 5/2009 | ......... | F28D 1/05391 |
| EP | 2372283 A1 | 10/2011 | | |
| EP | 2857783 A1 | 4/2015 | | |
| EP | 3169964 A1 | 5/2017 | | |
| JP | H9-189463 A | 7/1997 | | |
| JP | 2003-214793 A | 7/2003 | | |
| JP | 2005-188787 A | 7/2005 | | |
| JP | 2005-345038 A | 12/2005 | | |
| WO | WO-2004048875 A1 * | 6/2004 | ......... | F28D 1/05366 |
| WO | 2014/091747 A1 | 6/2014 | | |

\* cited by examiner

HEADER BOX AND HEAT EXCHANGER

CROSS REFERENCE TO RELATED APPLICATIONS

This application is a 35 U.S.C. § 371 National Phase conversion of International (PCT) Patent Application No. PCT/CN2019/088400, entitled "Pipe Connecting Box and Heat Exchanger", filed on May 24, 2019, which requires priorities of a Chinese Patent Application filed on May 25, 2018 with Application No. 201810517648.4 and an invention titled "heat exchanger", a Chinese Patent Application filed on May 25, 2018 with Application No. 201810517647.X and an invention titled "heat exchanger", a Chinese Patent Application filed on May 25, 2018 with Application No. 201810517644.6 and an invention titled "header box and heat exchanger", and a Chinese Patent Application filed on Jun. 5, 2018 with Application No. 201810569282.5 and an invention titled "header box and heat exchanger", the entire contents of which are incorporated into this application herein by reference for all purposes. The PCT International Patent Application was filed and published in Chinese.

TECHNICAL FIELD

This application relates to a field of heat exchange, in particularly to header boxes and heat exchangers.

BACKGROUND

Heat exchange devices, also known as heat exchangers, are widely used in heat exchange systems (such as air conditioning systems). The heat exchanger can be used for heat exchange between a refrigerant and the outside air, and can also be used for heat exchange between the refrigerant and a cooling liquid. The flow rate of the heat exchange medium in the heat exchanger is also an important factor affecting its heat exchange efficiency.

In automotive air conditioning systems, it is required to minimize the height of a header box of the heat exchanger as much as possible. Without increasing the space occupied by the heat exchanger, the height of the header box decreases and the volume of a heat exchange core increases, which is helpful to increase the heat exchange capacity of the heat exchanger.

For the heat exchangers that use CO2 as the refrigerant, due to the high operating pressure of the CO2 refrigeration system, high pressure resistant performance of the heat exchangers is also required.

SUMMARY

In view of this, the present application discloses a header box and a heat exchanger.

According to an aspect of the present application, it is provided a header box including a bottom plate and a cover plate. The bottom plate includes a first surface and a second surface opposite to the first surface. The first surface is at least partially recessed inwardly to form at least one first hole which extends along a length direction of the bottom plate. The second surface is at least partially recessed inwardly to form at least two second holes which extend along a width direction of the bottom plate. Wherein the first hole is communicated with the at least two second holes, so that fluid flowing through the first hole is capable of being distributed to the at least two second holes, or fluid flowing through the second holes is capable of being collected to the first hole. The cover plate is connected to the first surface to block an opening of the first hole on the first surface.

According to another aspect of the present application, it is provided a header box including a cover plate and a bottom plate. The cover plate is provided with a groove extending along a length direction of the cover plate. The groove includes an opening portion. The bottom plate is provided with an opening for inserting a flat tube. The opening extends through an upper surface and a lower surface of the bottom plate. The opening includes a first opening close to the cover plate and a second opening away from the cover plate. A cross-sectional area of the first opening is larger than a cross-sectional area of the second opening, wherein the opening portion of the groove is provided toward the bottom plate.

According to another aspect of the present application, it is provided with a heat exchanger including a casing with a chamber formed in the casing, a core at least partially accommodated in the chamber and a first header box as described in any one of the above aspects. The core includes flat tubes for circulating a first heat exchange medium. A side wall of the casing is provided with an opening section in communication with the chamber. The opening section extends along a stacking direction of the flat tubes.

DETAILED DESCRIPTION

Figure 1:
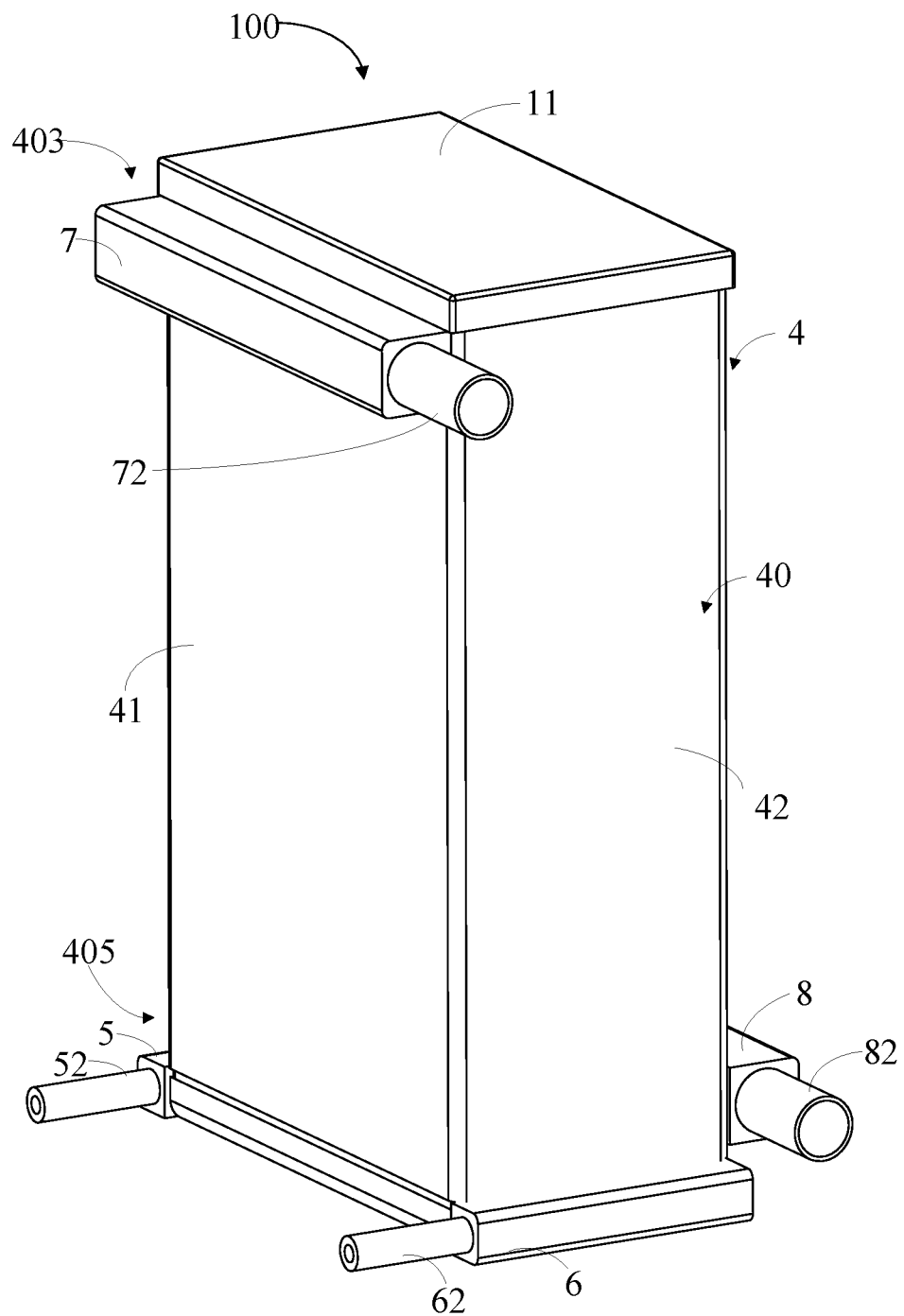
FIG. 1 is a schematic view of an overall structure of a heat exchanger according to an exemplary embodiment of the present application.
Figure 2:
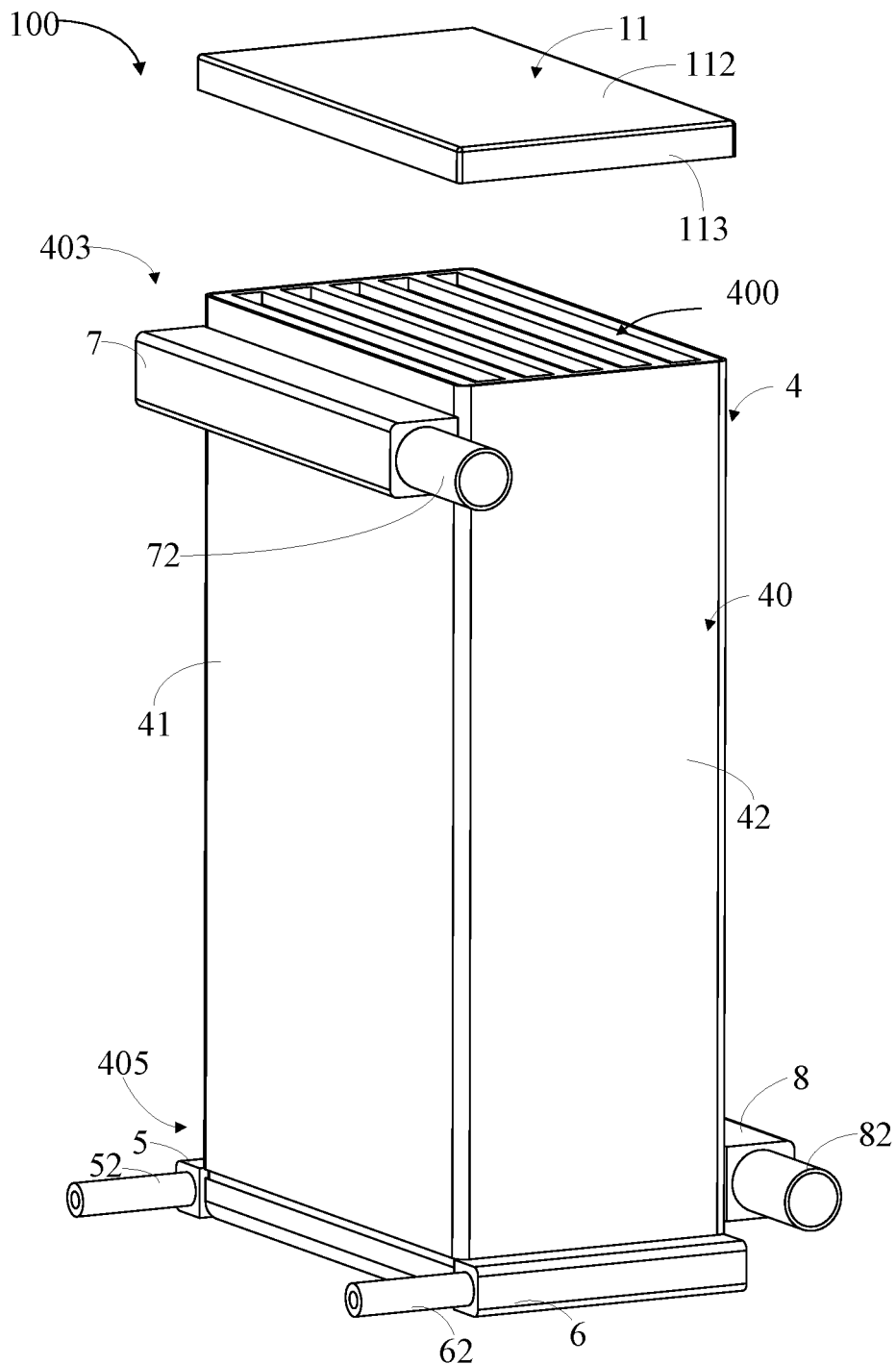
FIG. 2 is a partial exploded schematic view of the heat exchanger shown in FIG. 1.
Figure 3:
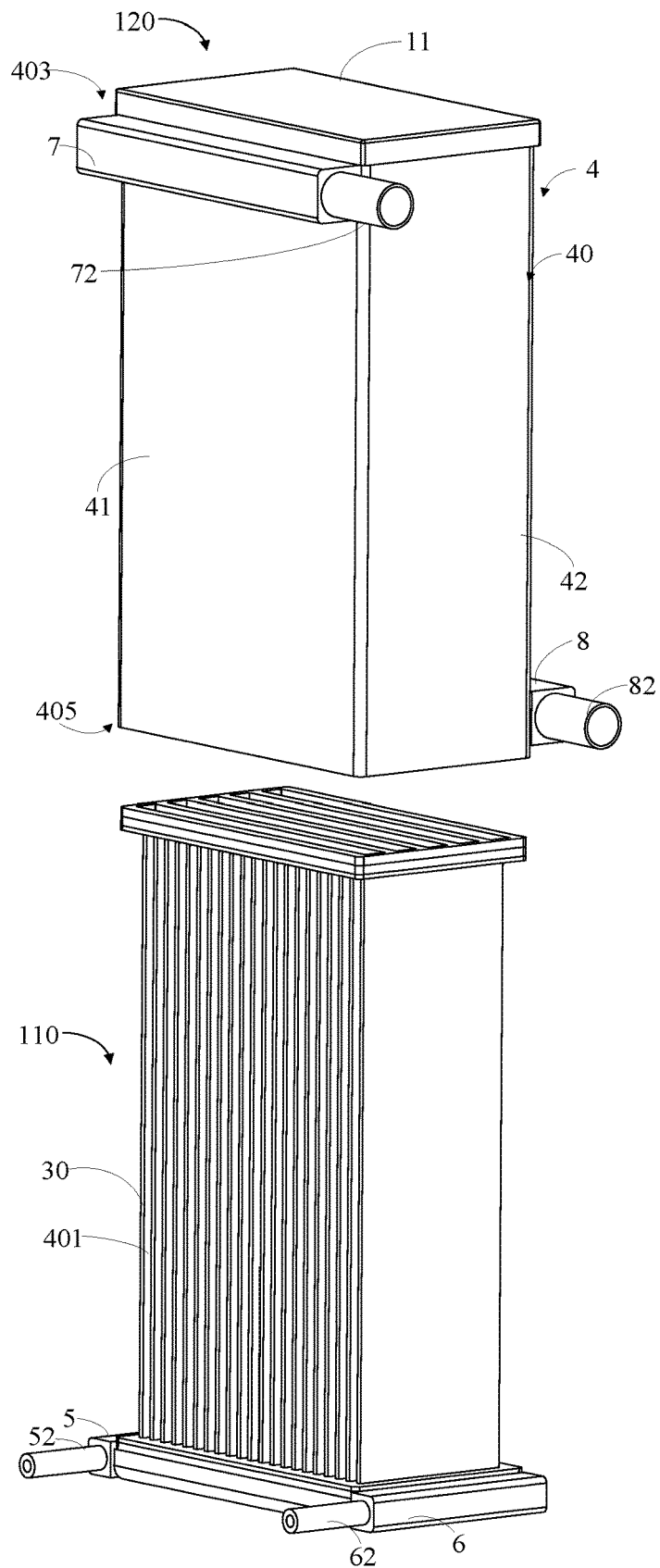
FIG. 3 is another partial exploded schematic view of the heat exchanger shown in FIG. 1.
Figure 4:
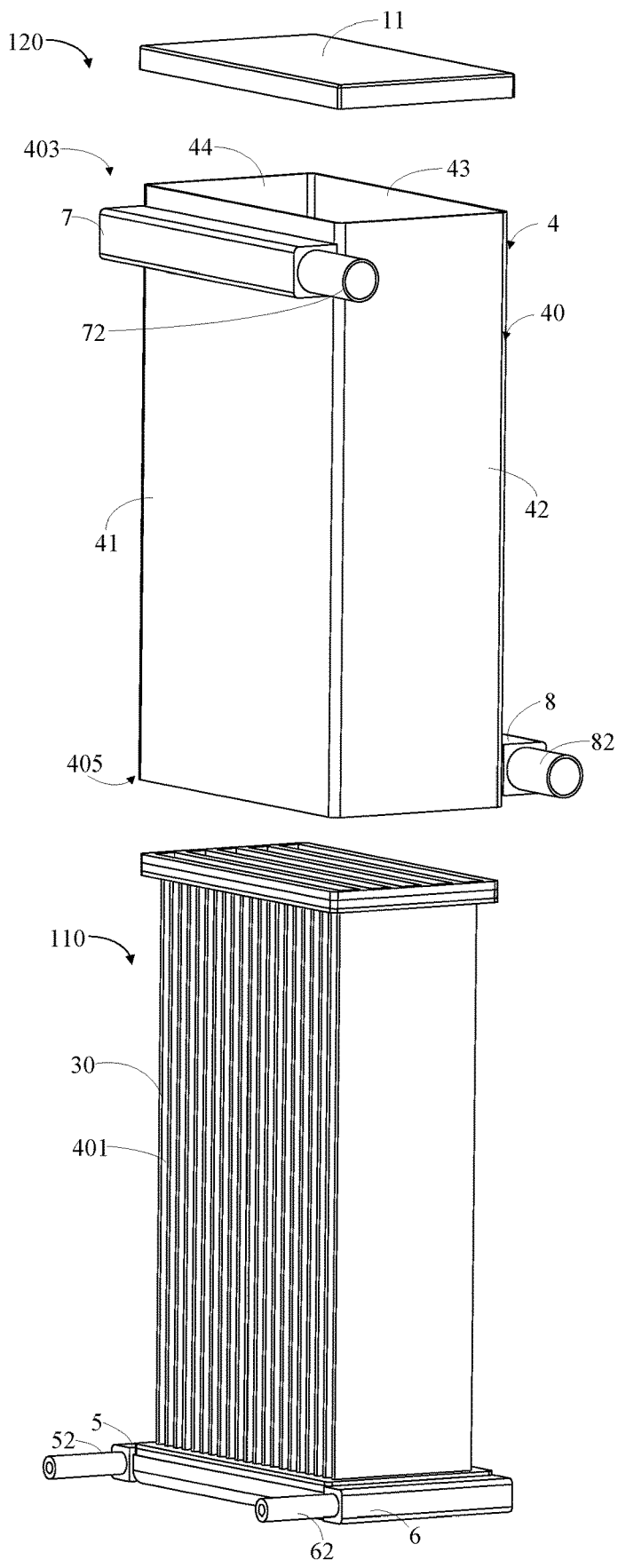
FIG. 4 is another partial exploded schematic view of the heat exchanger shown in FIG. 1.
Figure 5:
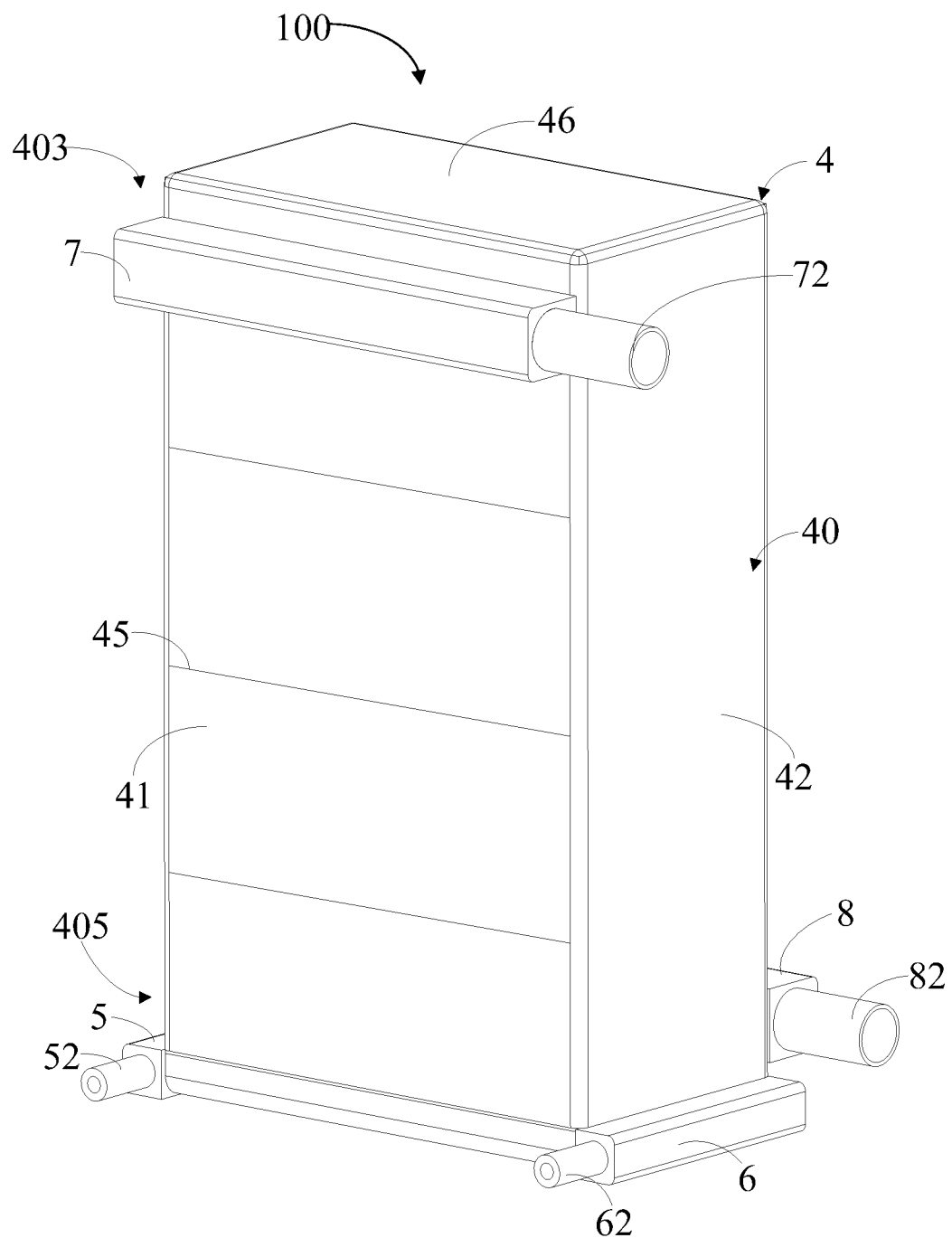
FIG. 5 is a schematic view of an overall structure of another heat exchanger according to an exemplary embodiment of the present application.
Figure 6:
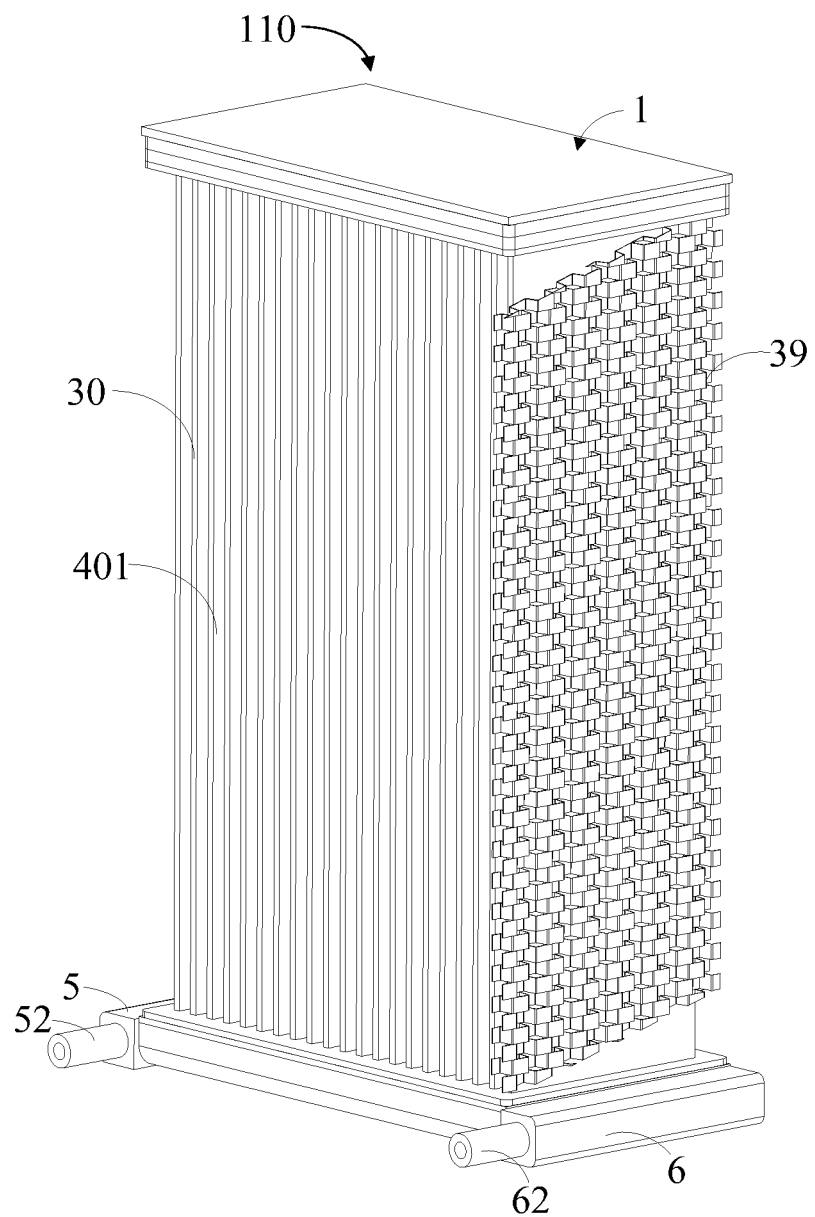
FIG. 6 is a schematic structural view of an internal core assembly according to an exemplary embodiment of the present application.
Figure 7:
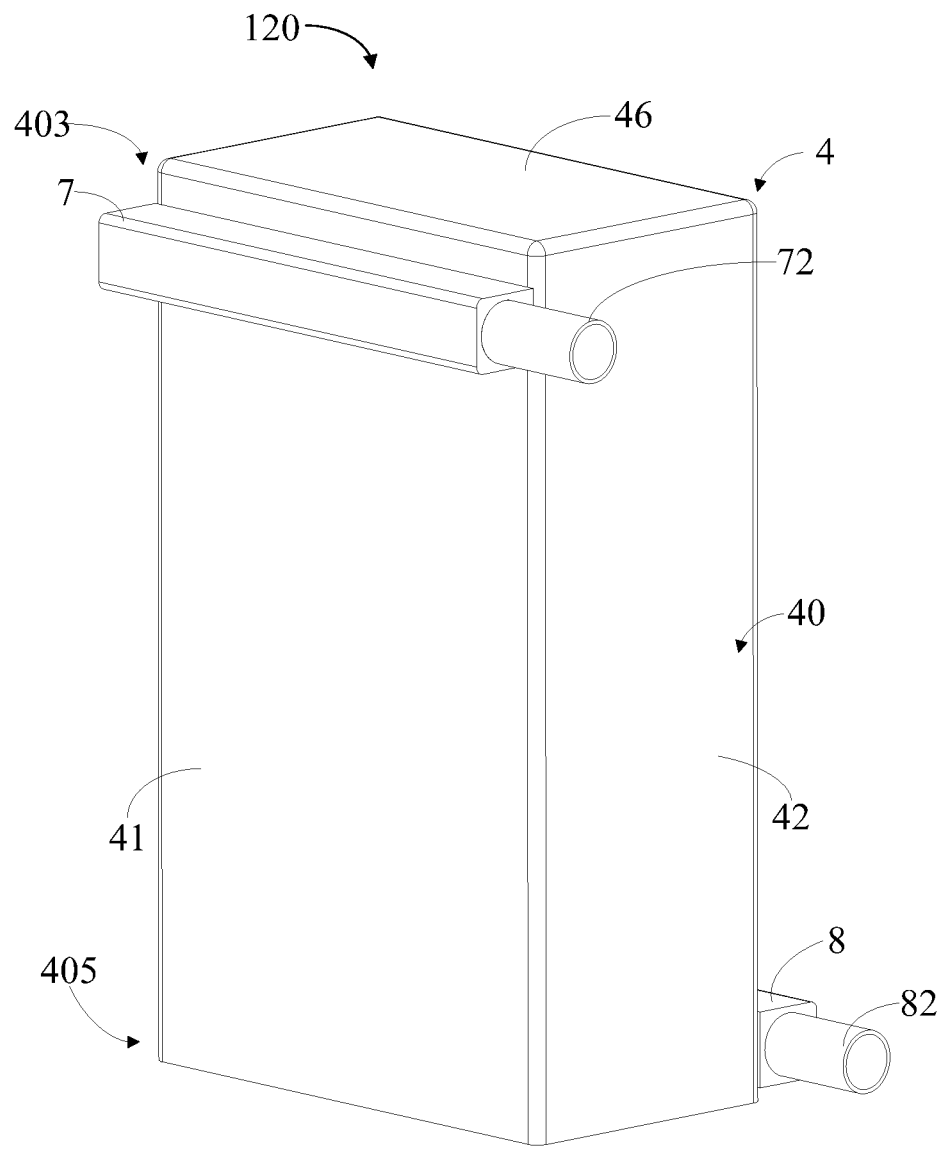
FIG. 7 is a schematic structural view of an external core assembly according to an exemplary embodiment of the present application.
Figure 8:
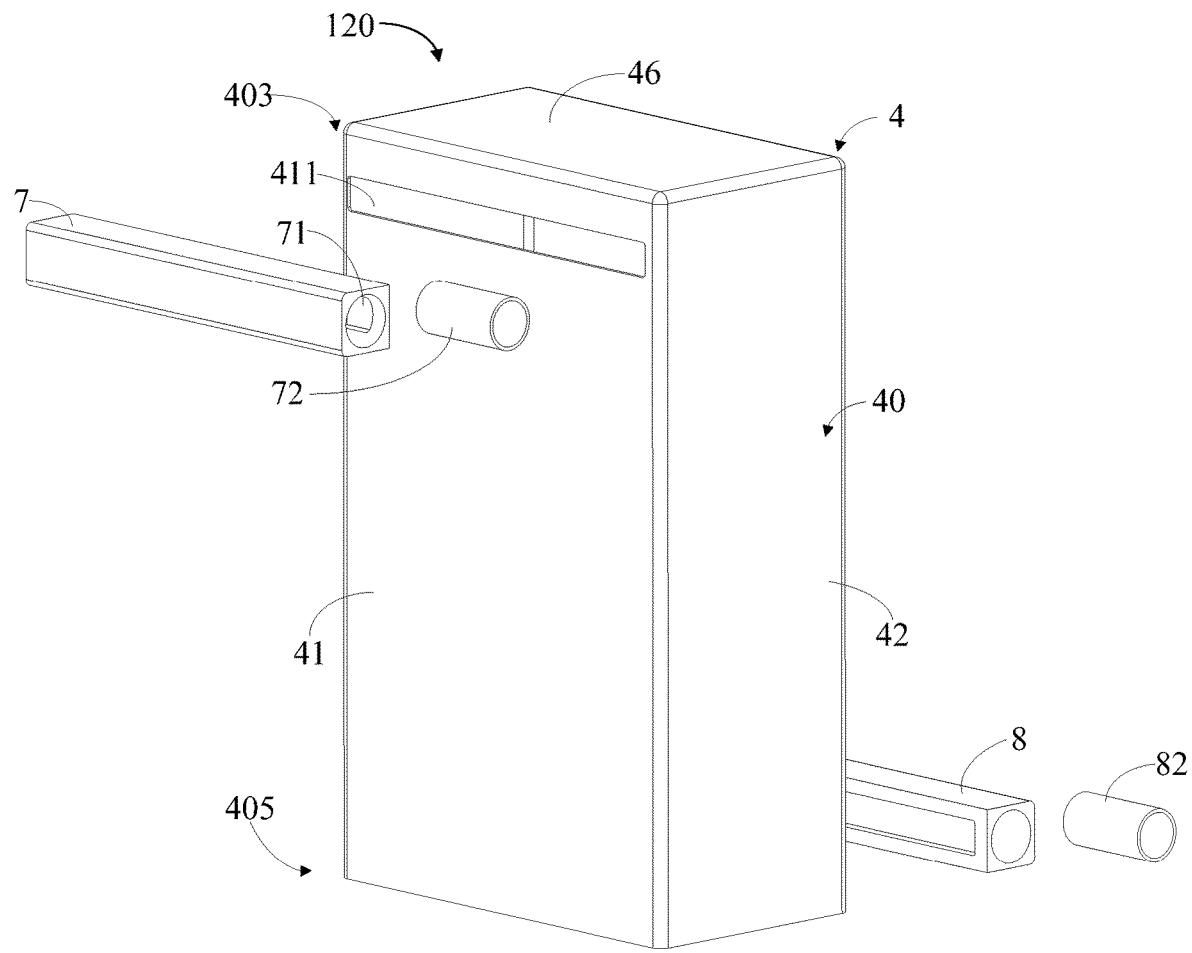
FIG. 8 is an exploded view of the external core assembly shown in FIG. 7.
Figure 9:
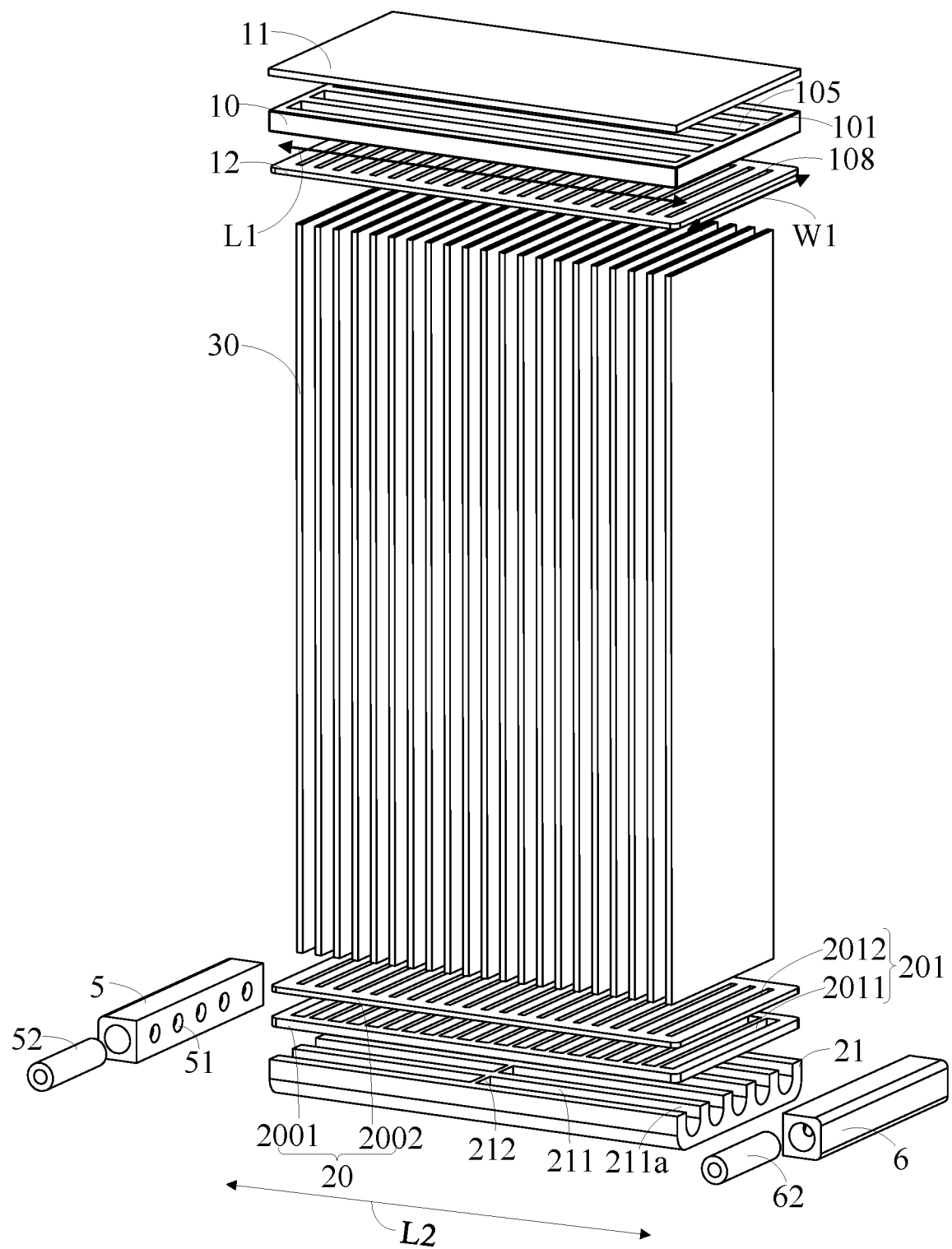
FIG. 9 is an exploded view of another internal core assembly in an exemplary embodiment of the present application.
Figure 10:
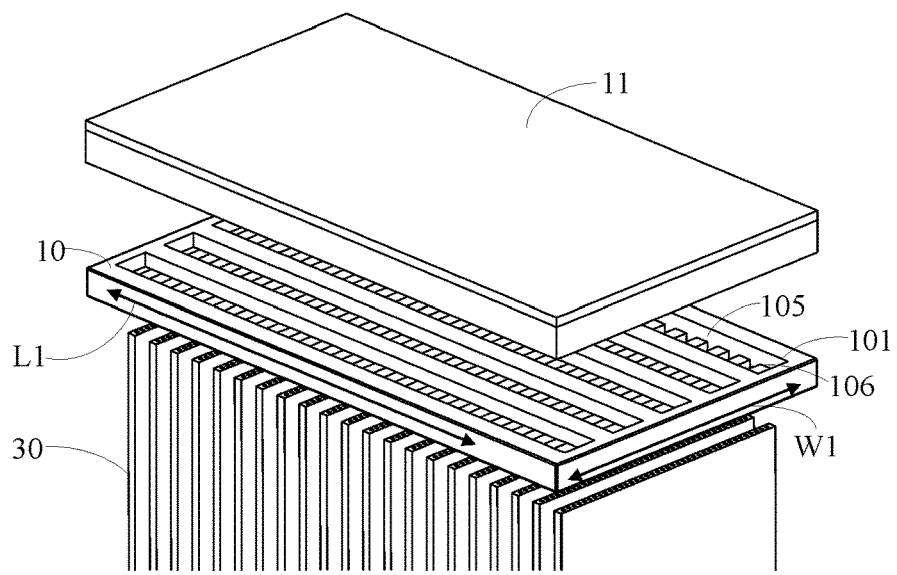
FIG. 10 is a partial schematic structural view of another heat exchanger according to an exemplary embodiment of the present application.
Figure 11:
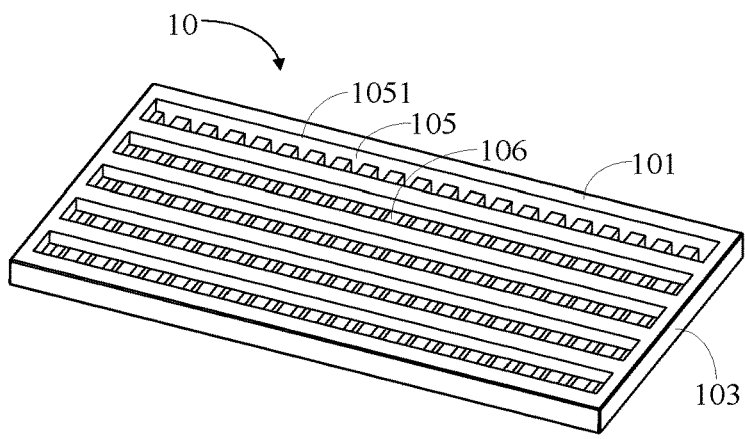
FIG. 11 is a schematic structural view of a first plate-shaped member according to an exemplary embodiment of the present application.
Figure 12:
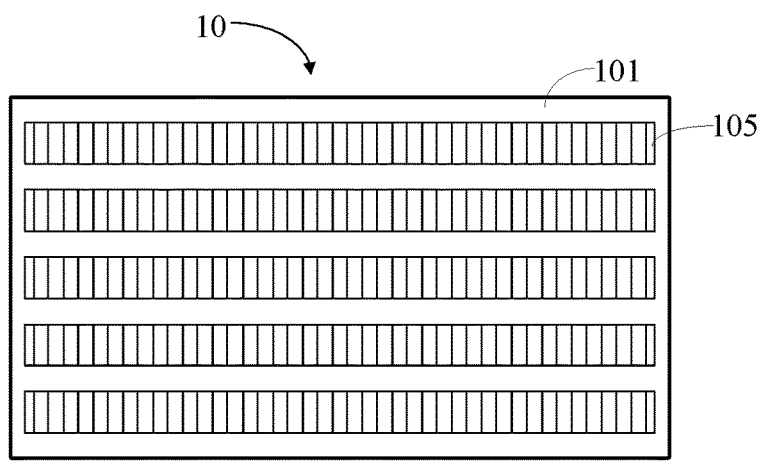
FIG. 12 is a plan view of the first plate-shaped member shown in FIG. 11.
Figure 13:
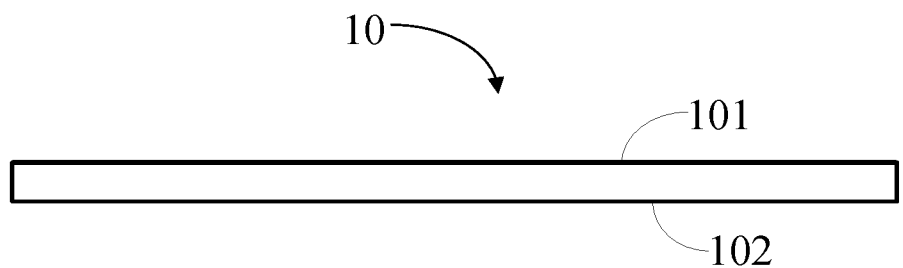
FIG. 13 is a side view of the first plate-shaped member shown in FIG. 11.
Figure 14:
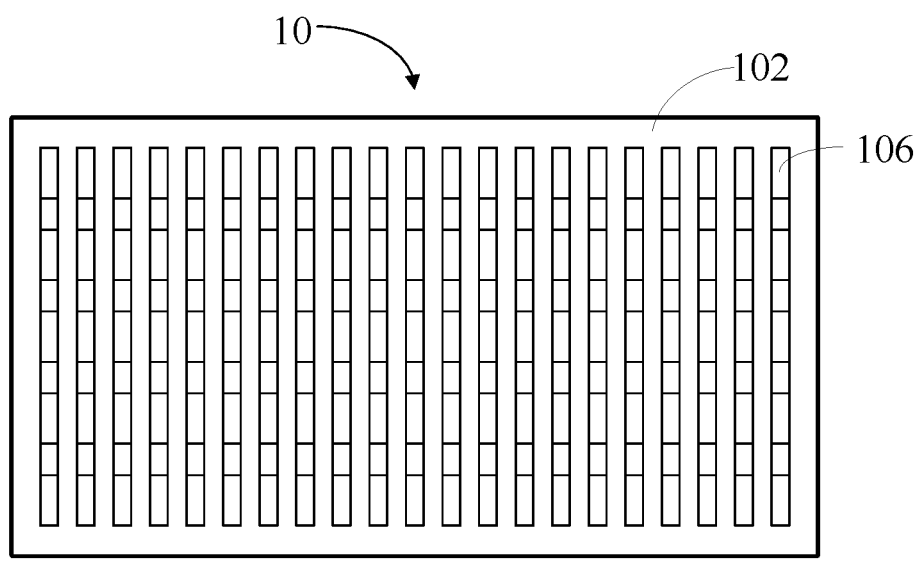
FIG. 14 is a bottom view of the first plate-shaped member shown in FIG. 11.
Figure 15:
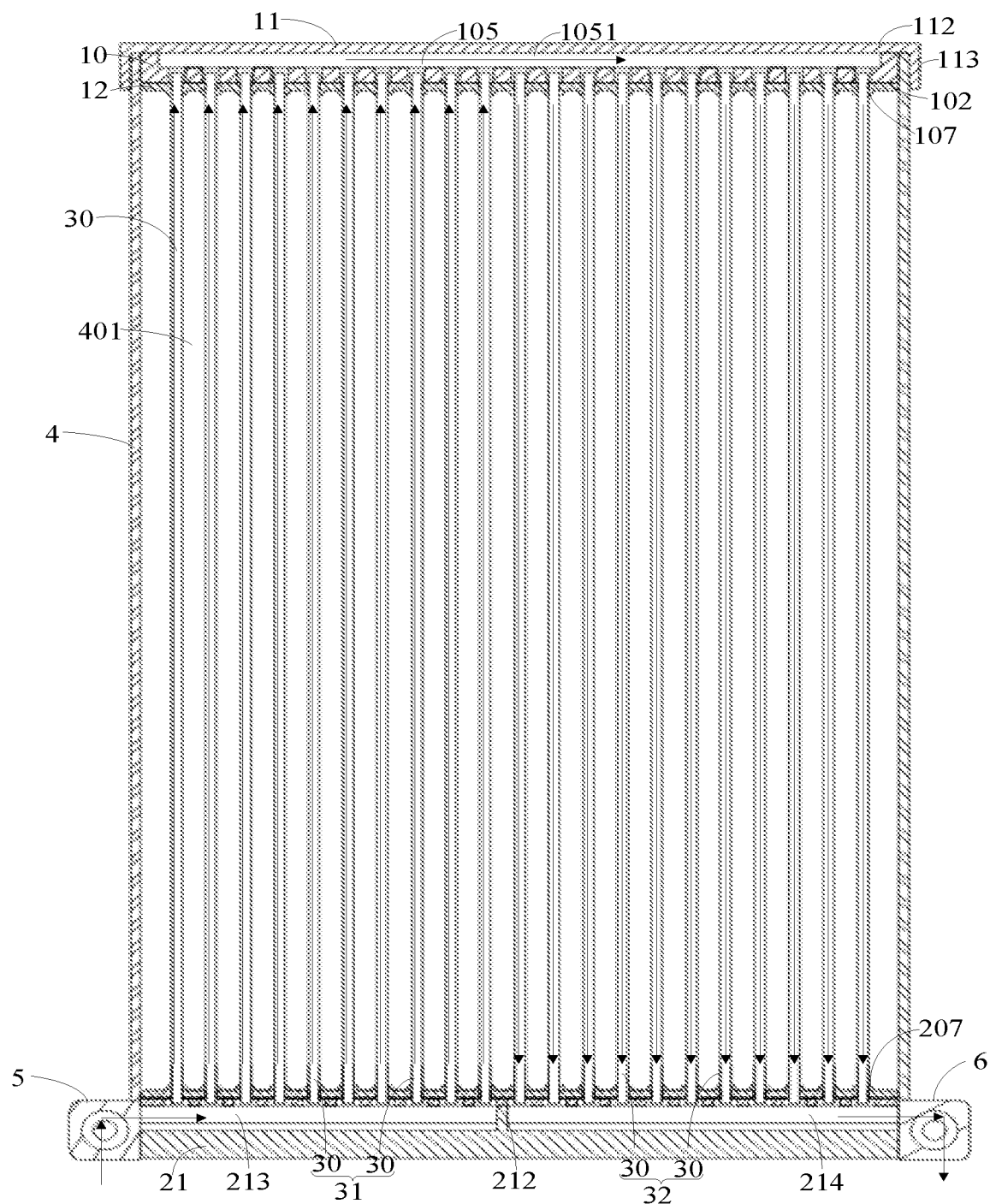
FIG. 15 is a cross-sectional view of another heat exchanger according to an exemplary embodiment of the present application.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects.

The heat exchangers according to the exemplary embodiments of the present application will be described in detail below with reference to the drawings. In the case of no conflict, the features in the following examples and embodiments can complement or be combined with each other.

FIG. 1 is a schematic structural view of a heat exchanger 100 according to an exemplary embodiment of the present application. The heat exchanger 100 can be used as a condenser, an evaporator and other heat exchange device. Moreover, the heat exchanger 100 can be applied to various heat exchange systems, such as a CO2 refrigeration system, and is also applicable to automotive industries.

Please refer to FIG. 1 and combine FIGS. 2 to 44 when necessary, the heat exchanger 100 includes a first header box 1, a second header box 2, a core 3 and a casing 4. The first header box 1 and the second header box 2 are located at two ends of the casing 4. The structure of the casing 4 will be described in detail in the following embodiments, and will not be described here. A chamber 400 is formed inside the casing 4, and part or all of the core 3 is accommodated in the chamber 400.

The core 3 includes a plurality of flat tubes 30 for circulating a first heat exchange medium. The flat tubes 30 are arranged at intervals in the chamber 400 inside the casing 4 so as to divide the chamber 400 into a plurality of heat exchange channels 401 for circulating a second heat exchange medium. Wherein adjacent heat exchange channels 401 may be connected or disconnected, which is not limited in this application, and can be set according to specific application environment.

The number of the flat tubes 30 may be one or more. The flat tube may be a microchannel flat tube, which includes a plurality of micro channels 302 arranged in a width direction of the flat tube 30 (refer to FIG. 17). By using of the microchannel flat tube, it can better increase the strength of the flat tubes, thereby improving the stability and safety of the heat exchanger. If there are multiple flat tubes, the multiple flat tubes may be arranged in parallel at intervals. In addition, each layer of the flat tubes may be a flat tube or a wide flat tube formed by arranging multiple flat tubes in the same plane. This application does not specifically limit the type, number and installation method of the flat tubes, which can be determined according to application environment.

In some embodiments, the first header box 1 includes a first bottom plate 10 and a cover plate 11. The first bottom plate 10 includes a first surface 101 and a second surface 102 opposite to the first surface 101. At least a portion of the first surface 101 is recessed inwardly to form at least one first hole 105 which extends along a length direction L1 of the first bottom plate 10. At least a portion of the second surface 102 is recessed inwardly to form at least two second holes 106 which extend along a width direction W1 of the first bottom plate 10. Wherein the first hole 105 is communicated with the at least two second holes 106, so that the fluid (the first heat exchange medium) flowing through the first hole 105 can be distributed to the at least two second holes 106, or the first heat exchange medium flowing through the second hole 106 can be collected into the first hole 105 to make the distribution of the first heat exchange medium more uniform. In addition, the first bottom plate 10 has a simple structure, a small volume and a lighter weight, which is beneficial to reduce the amount of materials and thus to reduce the weight of the heat exchanger.

The cover plate 11 is attached to the first surface 101 and closes an opening 1051 of the first hole 105.

The first bottom plate 10 may be an integrally formed plate, or may be formed by splicing two or more plates, for example, by welding multiple plates. For the first bottom plate 10 formed by splicing the multiple plates, the multiple plates have the first hole 105 and the second hole 106.

In some embodiments, the first bottom plate 10 is a plate structure (refer to FIGS. 9 to 15). The side of the first bottom plate 10 close to the cover plate 11 is a first surface 101, and the side of the first bottom plate 10 away from the cover plate 11 is a second surface 102.

Figure 16:
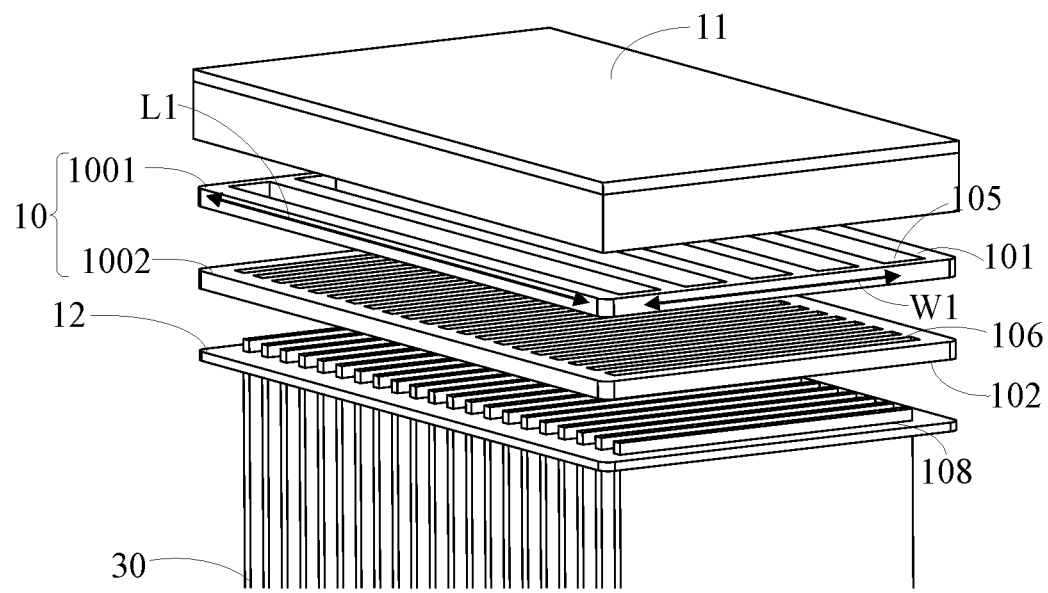
FIG. 16 is a partial structural schematic view of another heat exchanger according to an exemplary embodiment of the application.

In other embodiments, the first bottom plate 10 includes a first plate-shaped member 1001 and a second plate-shaped member 1002 welded together (refer to FIG. 16). The first plate-shaped member 1001 is attached to a side of the second plate-shaped member 1002 close to the cover plate 11. The side of the first plate-shaped member 1001 adjacent to the cover plate 11 is a first surface 101, and the side of the second plate-shaped member 1002 away from the cover plate 11 is a second surface 102. The first plate-shaped member 1001 has a first hole 105, and the second plate-shaped member 1002 has a second hole 106. The first hole 105 extends through the first plate-shaped member 1001, and the second hole 106 extends through the second plate-shaped member 1002.

Further, the second hole 106 includes a first opening communicated with the first hole 105 and a second opening away from the first hole 105. Alternatively, a cross-sectional area of the first opening is larger than a cross-sectional area of the second opening. Of course, the cross-sectional area of the first opening may also be equal to the cross-sectional area of the second opening.

Further, in some embodiments, the first header box 1 includes a second bottom plate 12 in addition to the first bottom plate 10 and the cover plate 11. The second bottom plate 12 is disposed on a side of the first bottom plate 10 facing away from the cover plate 11. The second bottom plate 12 is provided with a third hole 108 corresponding to the second hole 106.

Alternatively, a cross-sectional area of the third hole 108 is smaller than the cross-sectional area of the second hole 106. An end surface of one end of the flat tube 30 can be located in the second hole 106 to form a gap between an outer wall surface of the flat tube 30 and an inner wall surface of the second hole 106, which can effectively prevent solder between the first bottom plate 10 and the second bottom plate 12 from clogging an opening of the flat tube 30, and also help prevent solder between the cover plate 11 and the first bottom plate 10 from clogging the opening of the flat tube 30.

An edge of the third hole 108 extends a predetermined distance away from a side of the cover plate 11 to form a flange 107. It saves a layer of plate members and ensures insertion depth of the flat tube 30, thereby ensuring a welding area between the end of the flat tube 30 and the first header box 1, which is beneficial to improve the welding strength of the structure.

Figure 17:
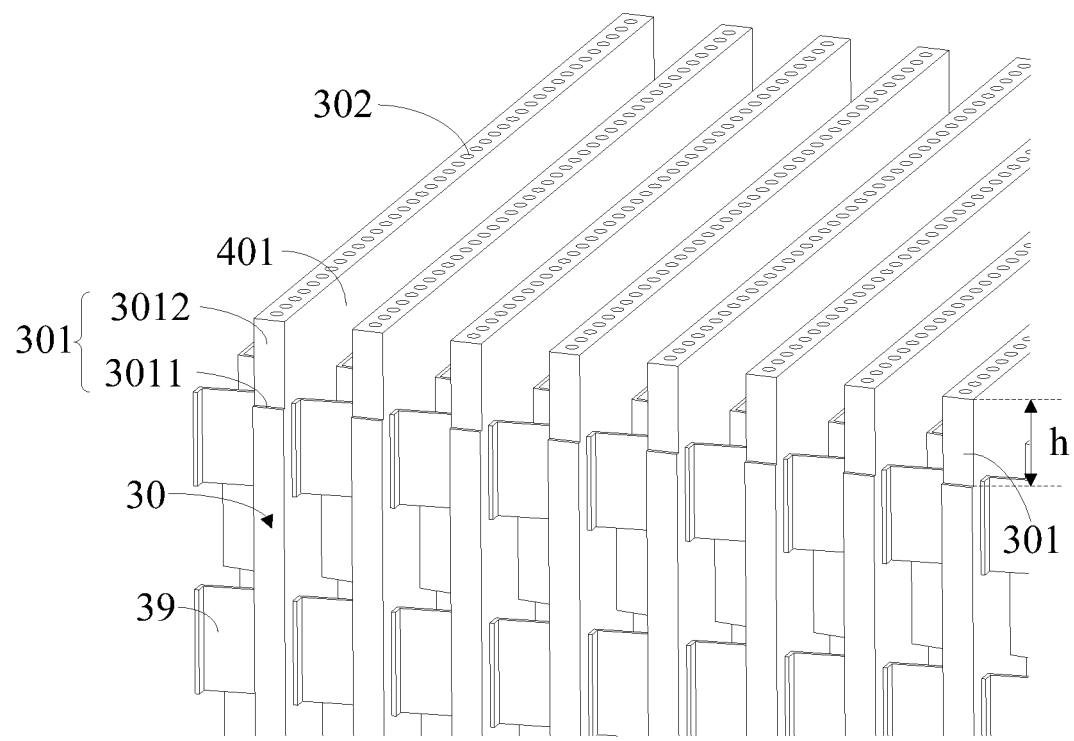
FIG. 17 is a partial structural view of an assembly of flat tubes and heat dissipation members.
Figure 18:
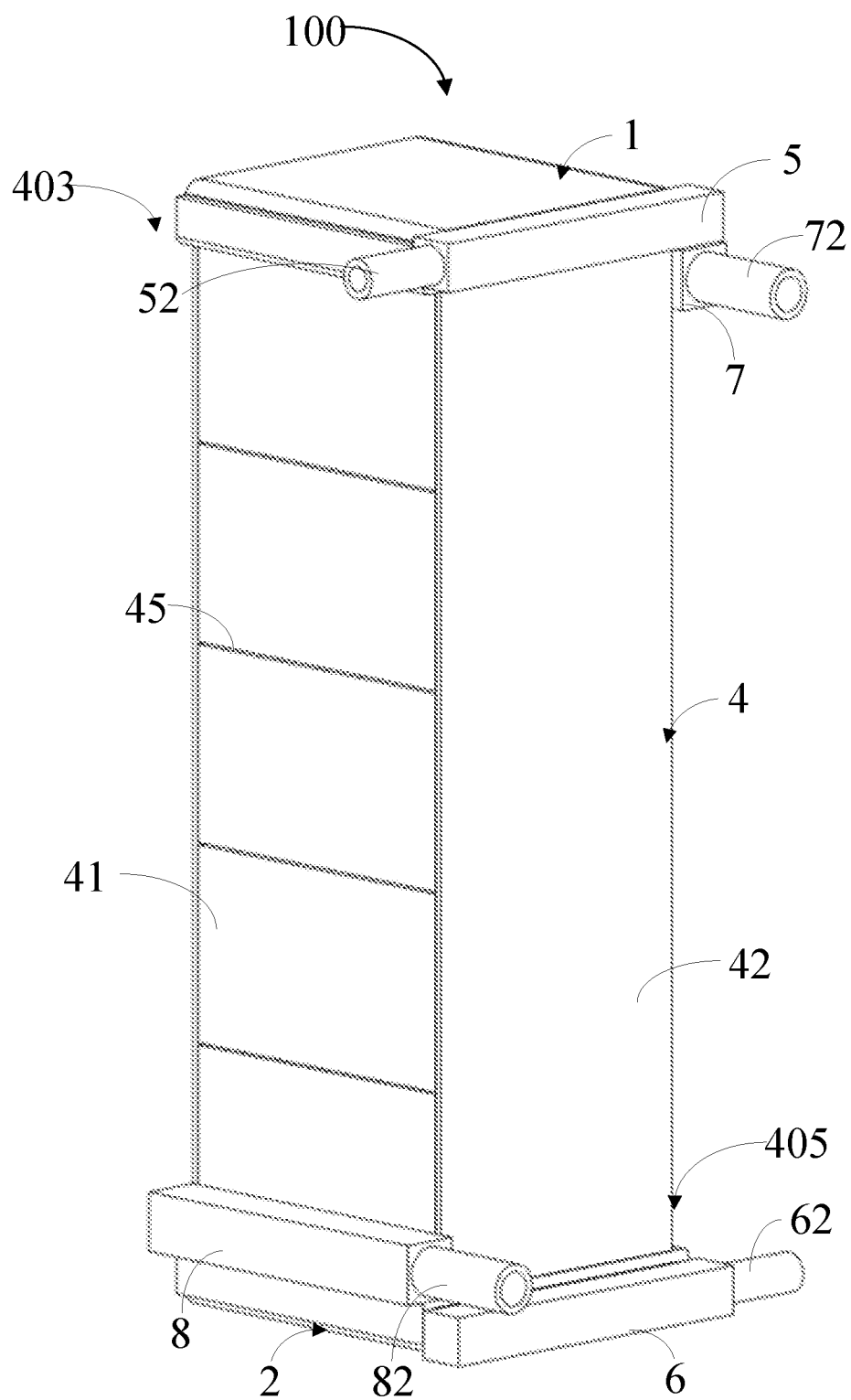
FIG. 18 is a schematic structural view of a heat exchanger according to an exemplary embodiment of the present application.
Figure 19:
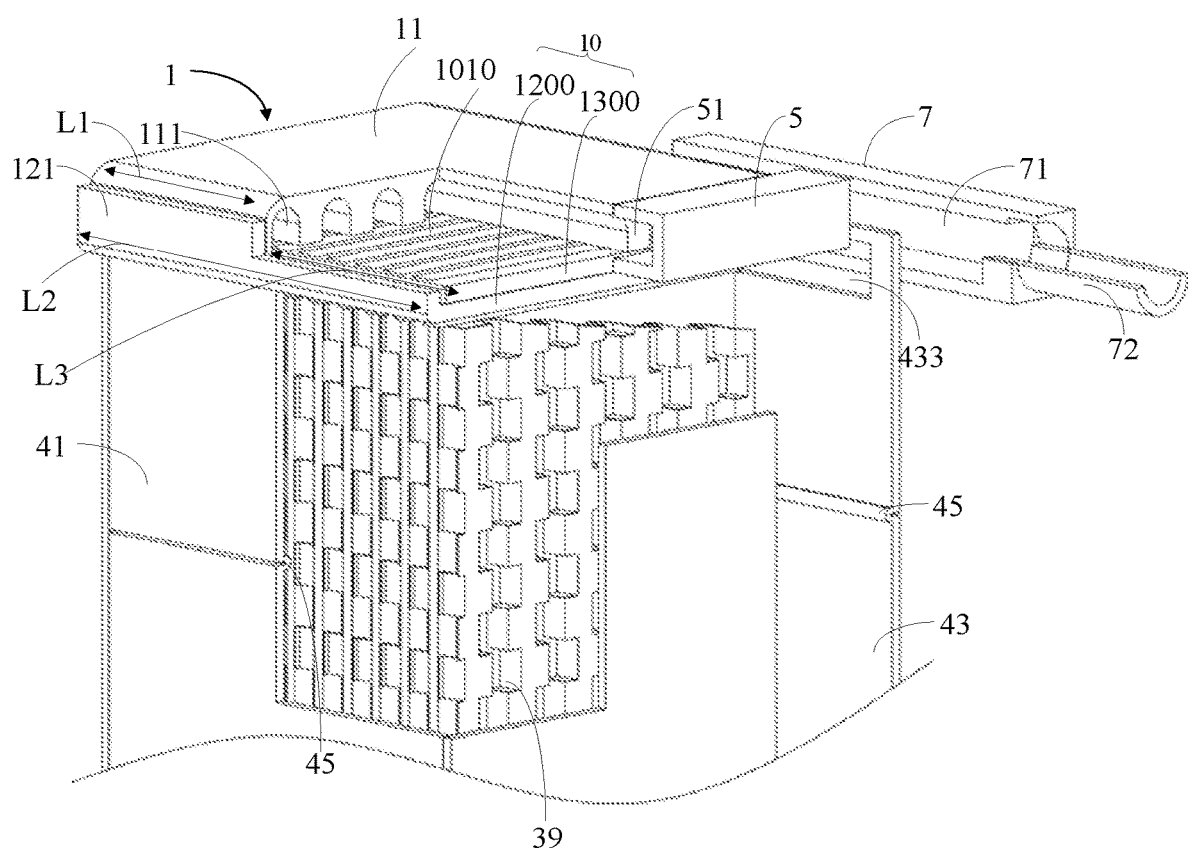
FIG. 19 is a partial schematic view of the heat exchanger shown in FIG. 18.
Figure 20:
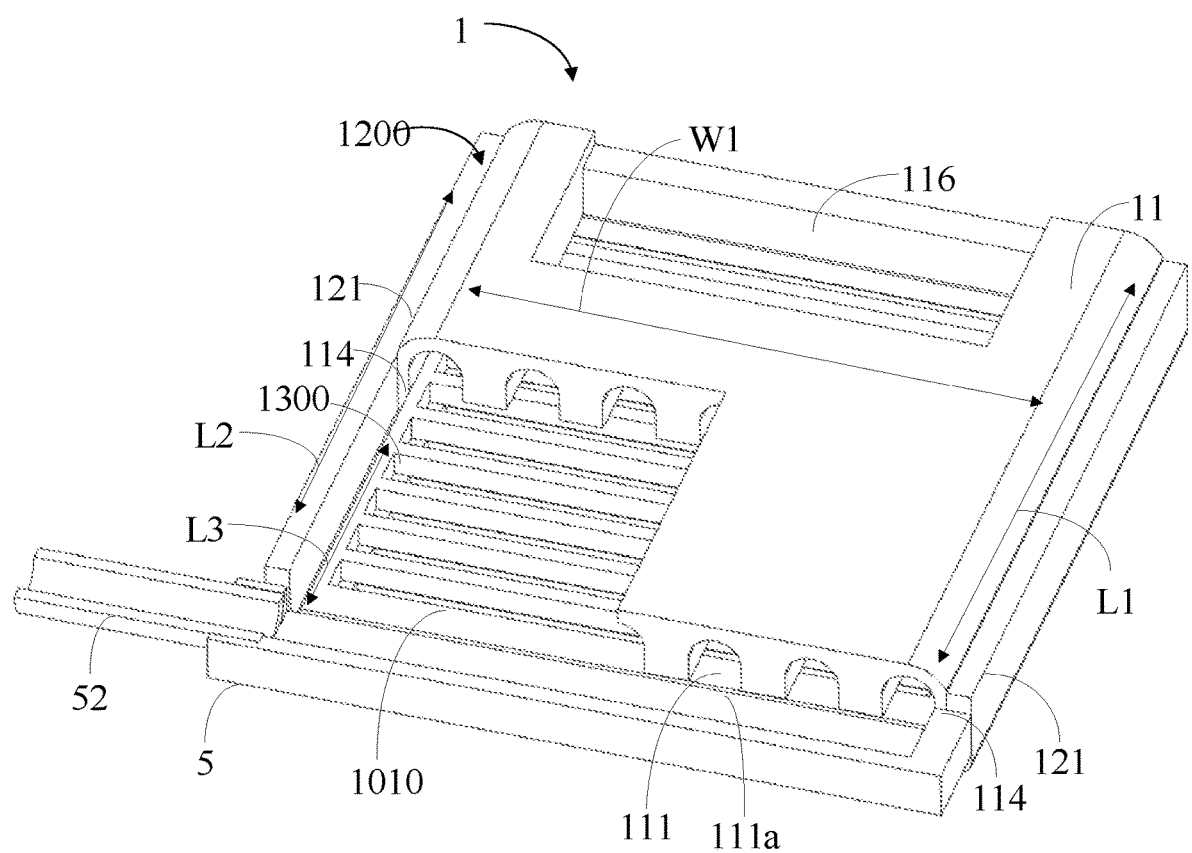
FIG. 20 is a schematic structural view of a header box according to an exemplary embodiment of the present application.
Figure 21:
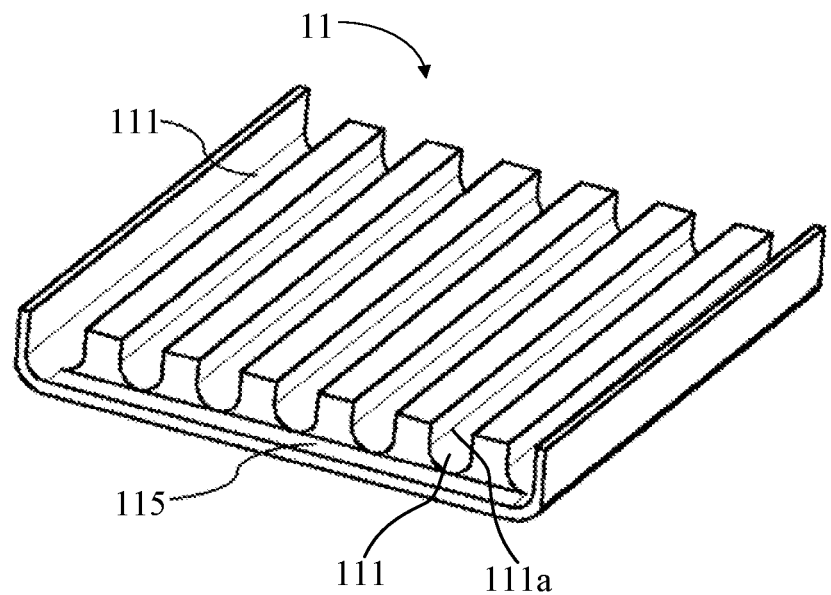
FIG. 21 is a schematic structural view of a cover plate according to an exemplary embodiment of the present application.
Figure 22:
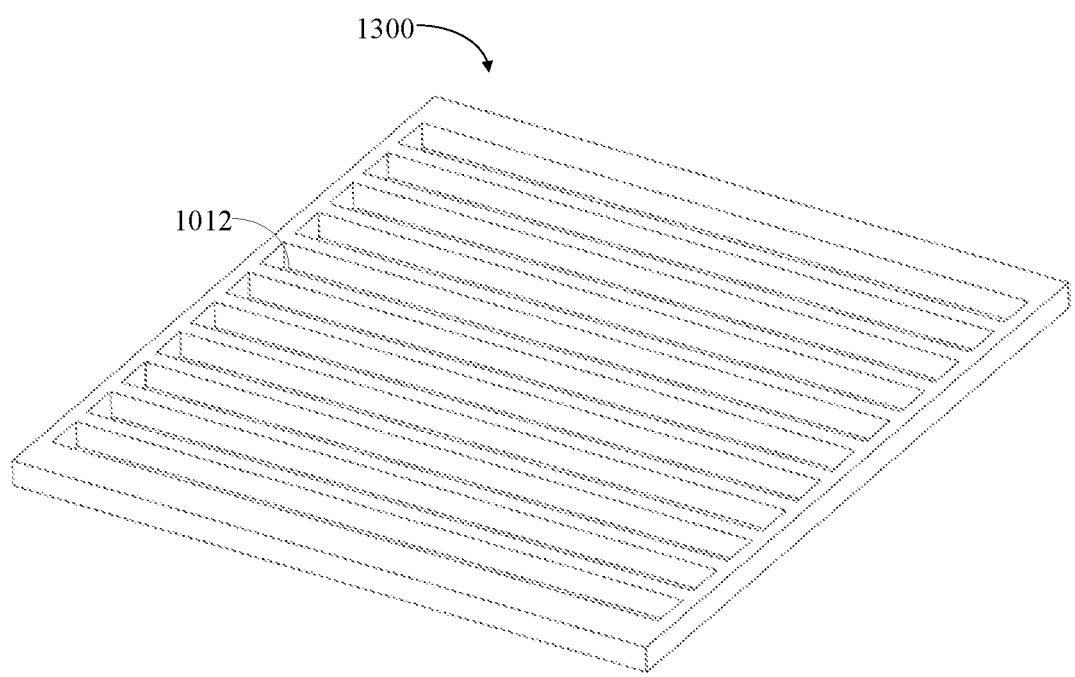
FIG. 22 is a schematic structural view of a second plate-shaped member according to an exemplary embodiment of the present application.
Figure 23:
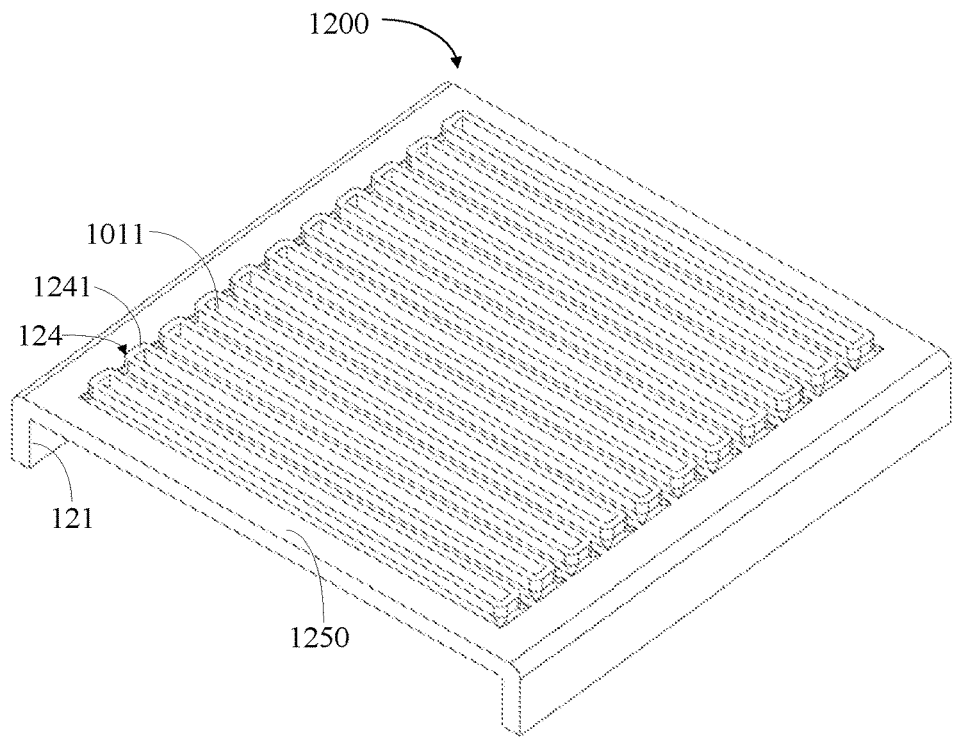
FIG. 23 is a schematic structural view of a first plate-shaped member according to an exemplary embodiment of the present application.
Figure 24:
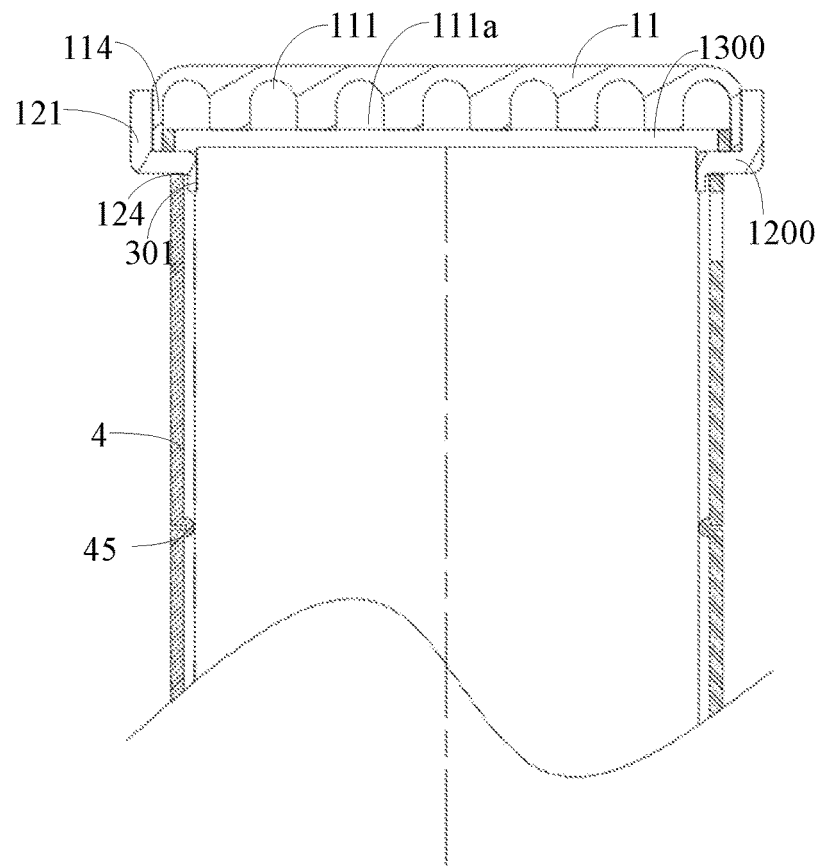
FIG. 24 is a partial cross-sectional view of the heat exchanger shown in FIG. 18.
Figure 25:
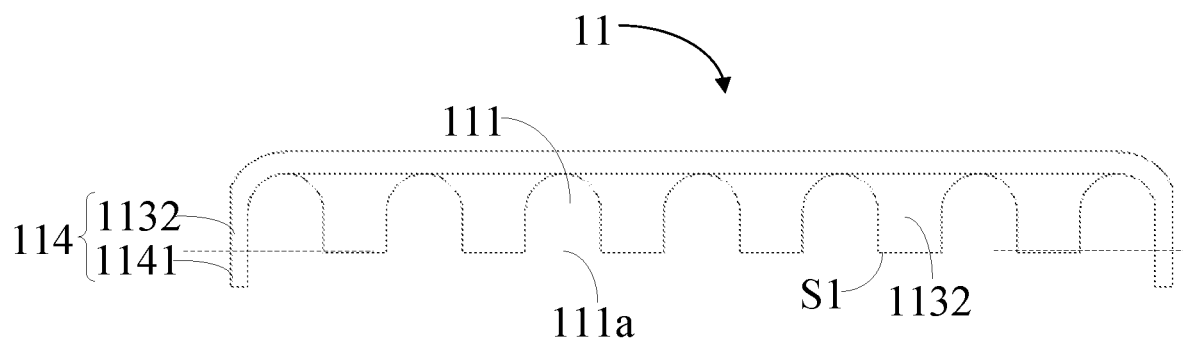
FIG. 25 is a side view of the cover plate shown in FIG. 21.
Figure 26:
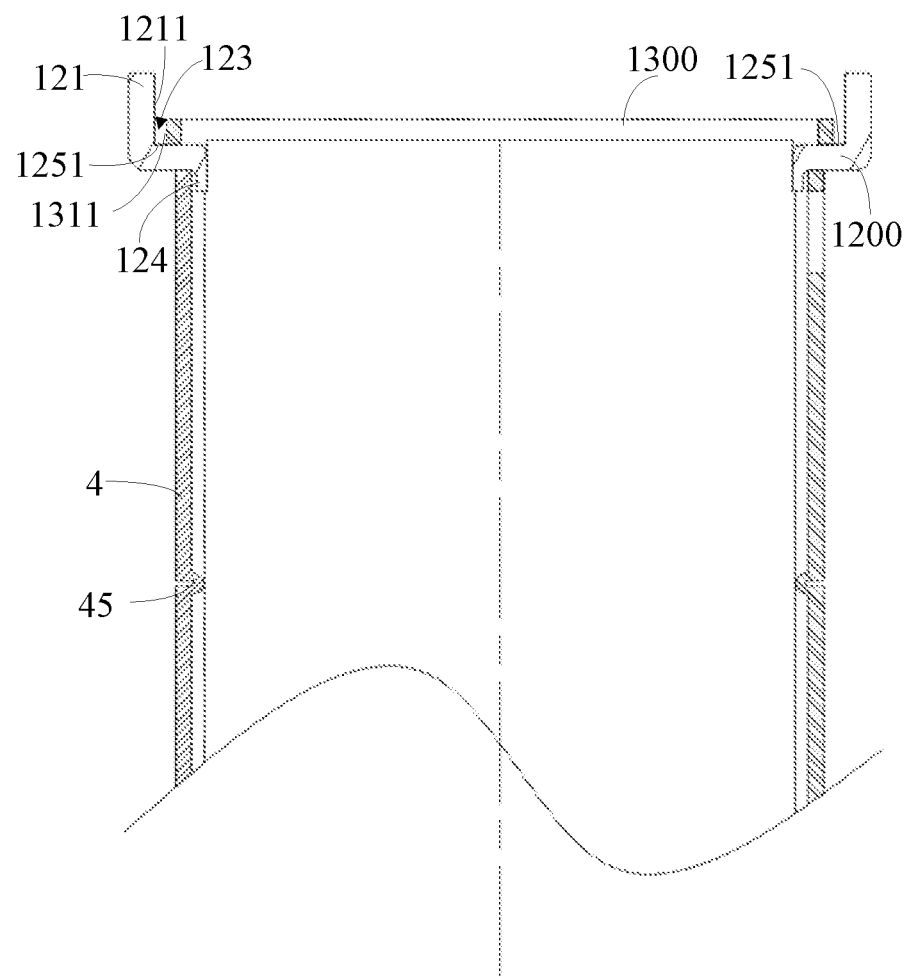
FIG. 26 is a cross-sectional view of another partial structure of an exemplary embodiment of the present application.
Figure 27:
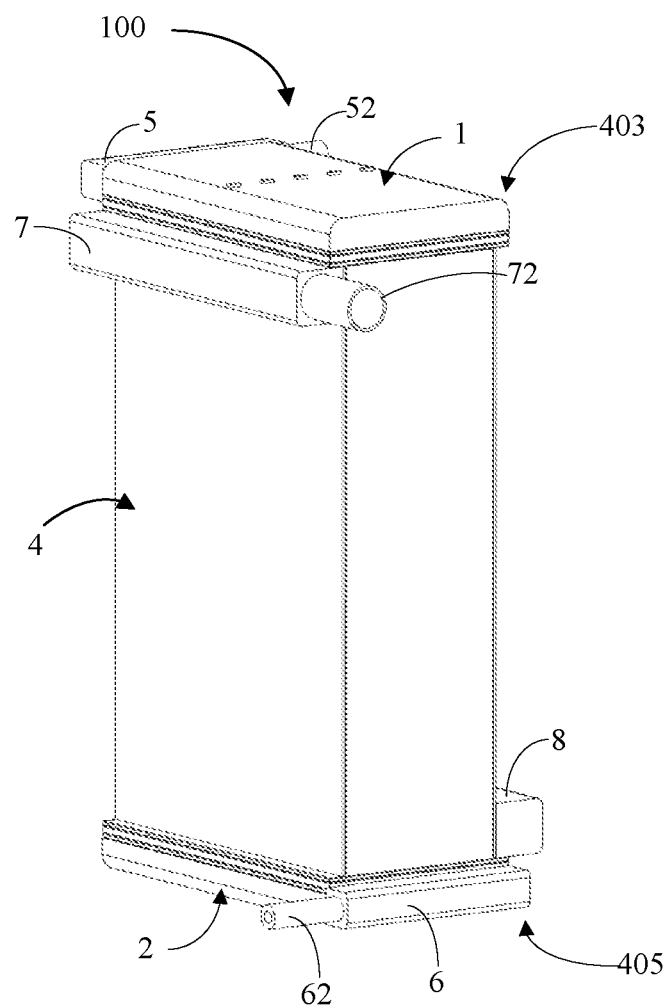
FIG. 27 is a schematic structural view of a heat exchanger of an exemplary embodiment of the present application.
Figure 28:
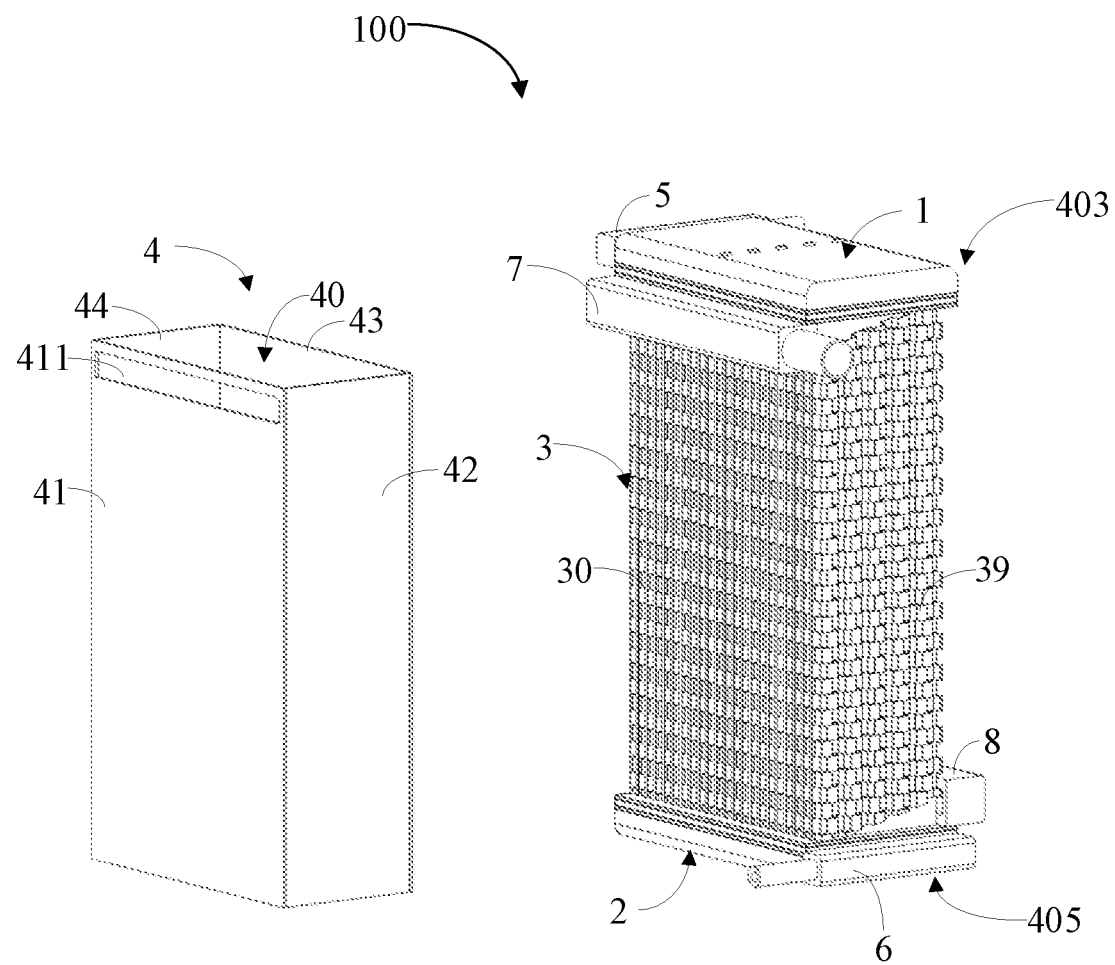
FIG. 28 is a partially exploded schematic view of the heat exchanger shown in FIG. 27.

Correspondingly, the end of the flat tube 30 may be provided with a constricted portion 301 which includes a side wall 3012 and a positioning surface 3011 (refer to FIG. 17). Part of the constricted portion 301 is inserted into the third hole 108, and the other part is inserted into the second hole 106 and fits an inner surface of the side wall 3012 and the flange 107, an inner surface of the third hole 108 and an inner surface of the second hole 106. The positioning surface 3011 abuts against the end surface of the flange 107 to facilitate the installation and positioning of the flat tube 30, and reduce the difficulty of assembling the flat tube 30 and the first header box 1. The constricted portion 301 can be obtained by necking processing through a necking tool. A height h of the constricted portion 301 can be set according to a depth required for the flat tube 30 to be inserted into the second hole 106.

Further, the second header box 2 can be used as a lower header box. The second header box 2 includes a cover plate 21 and a third bottom plate 20 (refer to FIG. 9).

The cover plate 21 is provided with a groove 211 extending along a longitudinal direction L2 of the cover plate 21. The groove 211 includes an opening portion 211a which is provided toward the third bottom plate 20. The third bottom plate 20 is provided with a fourth opening 201 communicating with the opening portion 211a. Correspondingly, one end of the flat tube 30 can be inserted into a fourth opening 201. Alternatively, an extending direction of the fourth opening 201 is perpendicular to the extending direction of the groove 211. It should be noted that for the feature of vertical in the embodiments of the present application, it should be understood that the slight deviation due to processing is also within the scope of this protection.

The third bottom plate 20 may be an integrally formed plate, or may be formed by splicing two or more plates, for example, by welding multiple plates. For the third bottom plate 20 formed by splicing a plurality of plates, the plurality of plates have openings forming the fourth opening 201.

For example, in some embodiments, the third bottom plate 20 includes a third plate-shaped member 2001 connected to the cover plate 21 and a fourth plate-shaped member 2002 away from the cover plate 21. The third plate-shaped member 2001 defines a first hole portion 2011 forming a fourth opening 201, and the fourth plate-shaped member 2002 defines a second hole portion 2012 forming the fourth opening 201. The first hole portion 2011 extends through the third plate-shaped member 2001, and the second hole portion 2012 extends through the fourth plate-shaped member 2002.

Alternatively, a cross-sectional area of the first hole portion 2011 is larger than a cross-sectional area of the second hole portion 2012. The other end surface of the flat tube 30 may be located in the first hole portion 2011, and a gap is formed between the outer wall surface of the flat tube 30 and the inner wall surface of the first hole portion 2011. It can effectively prevent the solder between the third plate-shaped member 2001 and the fourth plate-shaped member 2002 from clogging the opening of the flat tube 30, and also help prevent the solder between the cover plate 21 and the third plate-shaped member 2001 from clogging the opening of the flat tube 30.

An edge of the fourth opening 201 extends toward a side away from the cover plate 21 by a predetermined distance to form a flange 207. While saving a layer of plates, an insertion depth of the flat tube 30 can be ensured, thereby ensuring a welding area between the end of the flat tube 30 and the second header box 2, which is beneficial to improve the strength of the structure. Correspondingly, the end of the flat tube 30 inserted into the fourth opening 201 may also be provided with a constricted portion. For details, reference may be made to the related description of the above-mentioned constricted portion 301, which will not be repeated here.

A partition 212 is provided in the groove 211 to divide the groove 211 into first and second chambers 213, 214 separated from each other. The first chamber 213 and the second chamber 214 are substantially distributed along the length of the groove, so that the plurality of flat tubes 30 can be divided into a first tube group 31 which is communicated with the first chamber 213 and an interior of the first header box 1 (such as the first hole 105), and a second tube group 32 which is communicated with the second chamber 214 and an interior of the first header box 1 (such as the first hole 105) in order to increase the flow of the first heat exchange medium. This is also beneficial to increase the flow rate of the first heat exchange medium and improve the heat exchange efficiency of the heat exchanger. It should be noted that the groove can also be divided into more than three chambers. This application does not limit this, and can be set according to the specific application environment.

Further, along the length direction L2 of the cover plate 21, one end of the cover plate 21 is provided with a first header 5 communicated with the first chamber 213, and the other end is provided with a second header 6 communicated with the second chamber 214.

One end of the first header 5 is sealed, and the other end is provided with a first external pipe 52 for the first heat exchange medium to flow into the first header 5 or flow out of the first header 5. One or more header holes 51 are opened on the side of the first collecting tube 5 close to the second header box 2. The header holes 51 are communicated with the first chamber 213 for the first heat exchange medium to flow into or out of the second header box 2. One end of the second header 6 is sealed, and the other end is provided with a second external pipe 62 for the first heat exchange medium to correspondingly flow out of the second header 6 or flow into the second header 6. The side of the second header 6 close to the second header box 2 is also provided with one or more header holes (not shown). The header holes are communicated with the second chamber 214 for the first heat exchange medium to correspondingly flow out of the second header box 2 or flow into the second header box 2.

For example, the first heat exchange medium may enter the first header 5 from the first external pipe 52, flow from the first header 5 into the first chamber 213 of the second header box 2, flow into the first header box 1 through the first tube group 31, then flow into the second tube group 32 from the first hole 105 of the first header box 1, and then enter the second chamber 214, and finally flow out through the second external pipe 62 of the second header 6. At this point, the first heat exchange medium completes a heat exchange process.

Further, the casing 4 includes a lateral wall 40. A first end 403 of the casing 4 is closed and a second end 405 of the casing 4 is open to facilitate the installation of the first header box 1, the core 3 and other components. Wherein the lateral wall 40 may include four plates including a first side wall 41, a second side wall 42, a third side wall 43 and a fourth side wall 44. The first side wall 41, the second side wall 42, the third side wall 43 and the fourth side wall 44 may be integrally formed, or may be welded together.

In some embodiments, the cover plate 11 includes a main body portion 112 at a top end and connecting portions 113 extending downwardly from outer edges of the main body portion 112. At the first end 403, at least a portion of an outer side of the lateral wall 40 is welded to an inner side of the connecting portion 113 (refer to FIGS. 2 to 4, 10 and 16). At least part of the inner side of the lateral wall 40 is welded to a peripheral side wall 103 of the first bottom plate 10 (or a peripheral side wall 103 of the first bottom plate 10 and a peripheral side wall of the second bottom plate 12) in order to increase the welding area of the cover plate 11 and the lateral wall 40, thereby improving the welding strength of the casing 4.

In addition, an inside of the connecting portion 113 may be only welded to the peripheral side wall 103 of the first bottom plate 10, or welded to the peripheral side wall 103 of the first bottom plate 10 and the peripheral side wall of the second bottom plate 12. The end of the lateral wall 40 is welded to the second bottom plate 12.

In other embodiments, the casing 4 further includes a top wall 46 at the first end 403. The top wall 46 can be integrally formed with the lateral wall 40 (refer to FIGS. 5, 7 and 8). Correspondingly, the first header box 1 may not be provided with a cover plate. In this case, the top wall may serve as a cover plate to block the opening of the first hole 105. Compared with the casing obtained by welding multiple plates, the welding seam is reduced, the risk of leaking the heat exchange medium is reduced, and the strength and seal of the casing are improved. Of course, the top wall 46 can also be set independently from the lateral wall 40, which is not limited in this application and can be set according to the specific application environment. Of course, the first header box 1 may also be provided with a separate cover plate.

It should be noted that the cover plate 11 may not include the connecting portion 113, and the two ends of the side wall may be welded to the second and third bottom plates, respectively. For a heat exchanger without the second bottom plate, the two ends of the side wall can be welded to the first bottom plate and the third bottom plate, respectively.

The two ends of the side wall of the casing 4 are provided with opening sections 411, 433 communicating with the chamber 400. The opening sections 411, 433 extend in a stacking direction of the flat tubes 30.

Side walls of the casing 4 is provided with a third header 7 and a fourth header 8. The third header 7 and the fourth header 8 extend along the stacking direction of the flat tubes 30. The third header 7 and the fourth header 8 communicate with the chamber 400 through the opening sections 411, 433, respectively, so as to collect or distribute the second heat exchange medium. Relevant descriptions of the third header 7 and the fourth header 8 are as follows.

In the above embodiments, an assembly including the third and fourth headers 7, 8 and the casing 4 and so on serves as an outer core assembly 120, and an assembly including the first header box 1, the flat tubes 30 and the second header box 2 and so on serves as an inner core assembly 110. During the specific installation of the heat exchanger, the outer core assembly 120 and the inner core assembly 110 can be assembled together by nesting to facilitate the installation of the whole heat exchanger.

In some embodiments, the first header box 1 includes a cover plate 11 and a first bottom plate 10. The cover plate 11 is provided with a groove 111 extending along the length direction of the cover plate. The groove 111 is open on one side adjacent to the first bottom plate 10. Accordingly, the groove 111 includes an opening portion 111*a* adjacent to the first bottom plate 10. The first bottom plate 10 is provided with an opening 1010 (refer to FIGS. 19 and 20) into which the flat tube 30 is inserted. In some embodiments, the opening 1010 may be generally strip-shaped to form a longitudinal slot. The opening 1010 extends through the upper and lower surfaces of the first bottom plate 10. Alternatively, an extending direction of the groove 111 and the extending direction of the opening 1010 may be substantially perpendicular. It should be noted that minor deviations due to processing should be understood to be within the scope of this protection.

A cross section of the groove 111 may be semicircular, triangular, rectangular, semi-elliptical, or a combination of two or more of the above shapes.

The opening 1010 includes a first opening adjacent to the cover plate 11 and a second opening away from the cover plate 11. A cross-sectional area of the first opening is larger than a cross-sectional area of the second opening. At least a part of the opening portion 111*a* communicates with the first opening, so that the first heat exchange medium flows through the groove 111 and the opening 1010 to the flat tube 30 in sequence. This application does not limit the number of the grooves 111 and the number of the openings 1010, which can be determined according to specific application environment.

The opening 1010 may be a stepped hole, which is beneficial to increase the flow rate of the first heat exchange medium when entering the opening 1010 from the first opening. Of course, the opening 1010 may not be a stepped hole. For example, the opening 1010 has a substantially trumpet shape.

Along the width direction W1 of the cover plate 11, the cover plate 11 has two opposite side walls 114, and the first bottom plate 10 has two corresponding end surfaces. The two end surfaces facing the side walls of the cover plate 11 extend to form a hem 121 to cover the two side walls 114 of the cover plate 11, which is beneficial to increase the welding area of the cover plate and the bottom plate, thereby enhancing the structural strength of the header box. The length direction L2 of the hem 121 and the length direction L1 of the cover plate 11 may be substantially the same.

In some embodiments, the bottom plate is an integrally formed plate. Along the length direction L2 of the hem 121, the bottom plate adjacent to an inner surface of the hem 121 may be provided with a positioning groove 123. A length direction L3 of the positioning groove 123 is substantially the same as the length direction L2 of the hem 121. The positioning groove 123 has a bottom wall and two side walls. The hem 121 includes an inner wall 1211 facing the side wall 114. Wherein one side wall of the positioning groove 123 and the inner wall 1211 may be located substantially in the same plane.

In other embodiments, the first bottom plate 10 includes a first plate-shaped member 1200 provided with the hem 121 and a second plate-shaped member 1300 welded between the first plate-shaped member 1200 and the cover plate 11. The opening 1010 includes a first hole portion 1011 and a second hole portion 1012. The first hole portion 1011 extends through the first plate-shaped member 1200, and the second hole portion 1012 extends through the second plate-shaped member 1300 (refer to FIGS. 19, 20, 22 and 23). A gap is formed between the hem 121 and an end surface of the second plate-shaped member 1300 adjacent to the hem 121 so as to form the positioning groove 123 for receiving the side wall 114 of the cover plate 11. The second plate-shaped member 1300 includes an end surface 1311 adjacent to the hem 121. The end surface 1311 may serve as a side wall of the positioning groove 123, and a portion of the inner wall 1211 may serve as another side wall of the positioning groove 123.

The first plate-shaped member 1200 includes the hem 121 and a main body member 1250 provided with a first hole portion 1011. The hem 121 and the main body member 1250 may be formed integrally. For example, the hem 121 may be bent from a plate-shaped member, or may be connected by welding. Accordingly, the main body member 1250 includes a surface 1251 adjacent to a side of the second plate 1300, and at least a part of the surface 1251 can serve as a bottom wall of the positioning groove 123.

An edge of the opening 1010 extends a predetermined distance away from the side of the cover plate 11 to form a flange 124. In addition to save a layer of plates, the depth of the opening 1010 is ensured so as to ensure the insertion depth of the flat tube 30. At the same time, welding between plates is reduced, which is beneficial to manufacture.

The cover plate 11 includes a plurality of grooves. Reinforcement ribs 1132 are formed between two adjacent grooves. An end surface S1 of the reinforcement rib 1132 is substantially flat. Wherein the end surfaces S1 of the plurality of reinforcement ribs 1132 are approximately in the same plane (refer to FIGS. 21 and 25), so that the portion of the cover plate 11 that contacts the bottom plate 10 can be fitted and sealed.

The two side walls 114 of the cover plate 11 extend a certain distance from the plane defined by S1 to form protrusions 1141. At least part of the structure of the protrusions 1141 can be inserted into the positioning grooves 123. Therefore, the welding area between the cover plate and the bottom plate is further increased, and the structural strength of the header box is enhanced.

In some embodiments, along the length direction L1 of the cover plate 11, one end of the cover plate 11 is provided with a notch 115 communicating with the groove 111. A blocking member 116 is provided in the notch 115 to seal the end of the groove 111. The other end of the cover plate 11 is connected with a first header 5 which is communicated with the groove 111 to collect or distribute the first heat exchange medium. An opening 51 communicating with the groove 111 is opened on a side of the first header 5 adjacent to the cover plate 11. Moreover, one end of the first header 5 is sealed, and the other end is provided with an external pipe 52.

In other embodiments, the notch may not be provided, and the blocking member 116 and the cover plate 11 are integrally formed, or when processing the cover plate, one end of the groove does not penetrate.

In some other embodiments, two ends of the cover plate 11 are respectively provided with two headers communicating with the groove 111. A partition is provided in the groove 111 to divide the groove 111 into at least two mutually isolated chambers. The at least two mutually isolated chambers are arranged along the length direction L1 of the cover plate 11 to increase the flow of the first heat exchange medium and improve the heat exchange efficiency. Taking the groove 111 divided into two mutually isolated chambers as an example, the two headers are respectively connected to one chamber.

As described above, the end portion of the flat tube 30 may be provided with the constricted portion 301. The constricted portion 301 includes a side wall 3012 and a positioning surface 3011. The constricted portion 301 is inserted into the opening 1010, the side wall 3012 is in contact with the inner wall of the opening 1010, and the positioning surface 3011 abuts against the end surface 1241 of the flange 124, in order to facilitate the installation and positioning of the flat tube 30, and reduce the difficulty of assembling the flat tube and the header box. The constricted portion 301 can be obtained by necking processing by a necking tool. The height h of the constricted portion 301 can be set according to the depth of the flat tube 3 required to be inserted into the opening 1010.

The end surface of the flat tube 30 may extend through the first hole portion 1011 and be placed in the second hole portion 1012. For the structure in which the cross-sectional area of the second hole portion 1012 is smaller than the cross-sectional area of the first hole portion 1011, a gap can be formed between the outer wall surface of the flat tube 30 and the inner wall surface of the first hole portion 1011. The solder between the first plate-shaped member 1200 and the second plate-shaped member 1300 can be effectively prevented from clogging the opening of the flat tube 30.

One end of the flat tube 30 is communicated with an interior of the header box 1 through the opening 1010. Similarly, the second header box 2 has a bottom plate and a cover plate, and the bottom plate of the second header box 2 is provided with a corresponding opening for the other end of the flat tube 3 to be inserted, so that the flat tube 3 and the second header box 2 are internally communicated. The second header box 2 is provided with a second header 6 communicating with the second header box 2 to collect or distribute the first heat exchange medium. Similarly, one end of the second header 6 is sealed, and an external pipe 62 is provided at the other end of the second header 6. The structure of the second header box 2 is basically the same as that of the first header box 1. For details, reference may be made to the relevant description of the first header box 1, which will not be repeated here.

The first and second headers 5, 6 may be located on the same side outside of the casing 4. Of course, the first and second headers 5, 6 can also be located on different sides outside of the casing 4. For example, the first and second headers 5, 6 are located approximately and diagonally outside of the casing 4, which makes the distribution of the first heat exchange medium more uniform and improves the heat exchange effect. As a result, the first heat exchange medium and the second heat medium form countercurrent heat exchange, which makes the heat exchange between the two more sufficient. It can be set according to application environment, which is not limited in this application.

Of course, in some embodiments, only one of the first and second ends of the casing may be provided with a header box. Among them, for the setting of the header box, please refer to the related description above, which will not be repeated here.

The side wall of the casing 4 is provided with a third header 7 and a fourth header 8. The third header 7 and the fourth header 8 extend along the stacking direction of the flat tubes 30. The third header 7 and the fourth header 8 are communicated with the chamber 400 through the opening sections 411, 433, respectively, to collect or distribute the second heat exchange medium.

In some embodiments, the first header box 1 includes a cover plate 11 and a first bottom plate 10. The cover plate 11 is provided with a groove 111 extending along a length direction L of the cover plate 11. The groove 111 includes an open end 111*a* adjacent to the first bottom plate 10. The first bottom plate 10 is provided with an elongated opening 1010 (refer to FIG. 33) into which the flat tube 30 is inserted. The elongated opening 1010 includes a first opening 1010*a* close to the cover plate 11 and a second opening 1010*b* away from the cover plate 11. A cross-sectional area of the first opening 1010*a* is greater than a cross-sectional area of the second opening 1010*b*. At least part of the open end 111*a* is communicated with the first opening 1010*a* (refer to FIG. 33) so that the first heat exchange medium flows through the groove 111 and the elongated opening 1010 to the flat tube 30 in sequence. This application does not limit the number of the grooves 111 and the number of elongated openings 1010, which can be determined according to specific application environment.

During the flow of the first heat exchange medium, it flows into the flat tube through the elongated hole of which an opening area becomes from large to small, thereby reducing the resistance of the first heat exchange medium flowing in the header box.

A cross section of the groove 111 may be semicircular, triangular, rectangular, semi-elliptical, or a combination of two or more of the above shapes. Alternatively, the first bottom plate 10 may be a flat plate with the elongated holes. The cover plate 11 includes a plurality of groove edges 117 on both sides of the groove. The end surfaces S1 of the groove edges 117 are substantially flat. Wherein the end surfaces S1 of the plurality of groove edges 117 are substantially in the same plane (refer to FIG. 34), so that the portion of the cover plate 11 that contacts the first bottom plate 10 can be fitted and sealed.

The elongated opening 1010 may be a stepped hole (refer to FIG. 31), which is beneficial to increase the flow rate of the first heat exchange medium entering the elongated opening 1010 from the first opening. That is, it is beneficial to increase the flow rate of the first heat exchange medium. The length direction of the elongated opening 1010 may be substantially the same as the width direction W of the cover plate 11. Of course, it may not be the same.

The bottom plate may be an integrally formed plate, or may be formed by splicing two or more plates, for example, by welding multiple plates. For a bottom plate assembled by a plurality of plate members, the plurality of plate member are provided6 with holes which form the elongated openings 1010.

Figure 29:
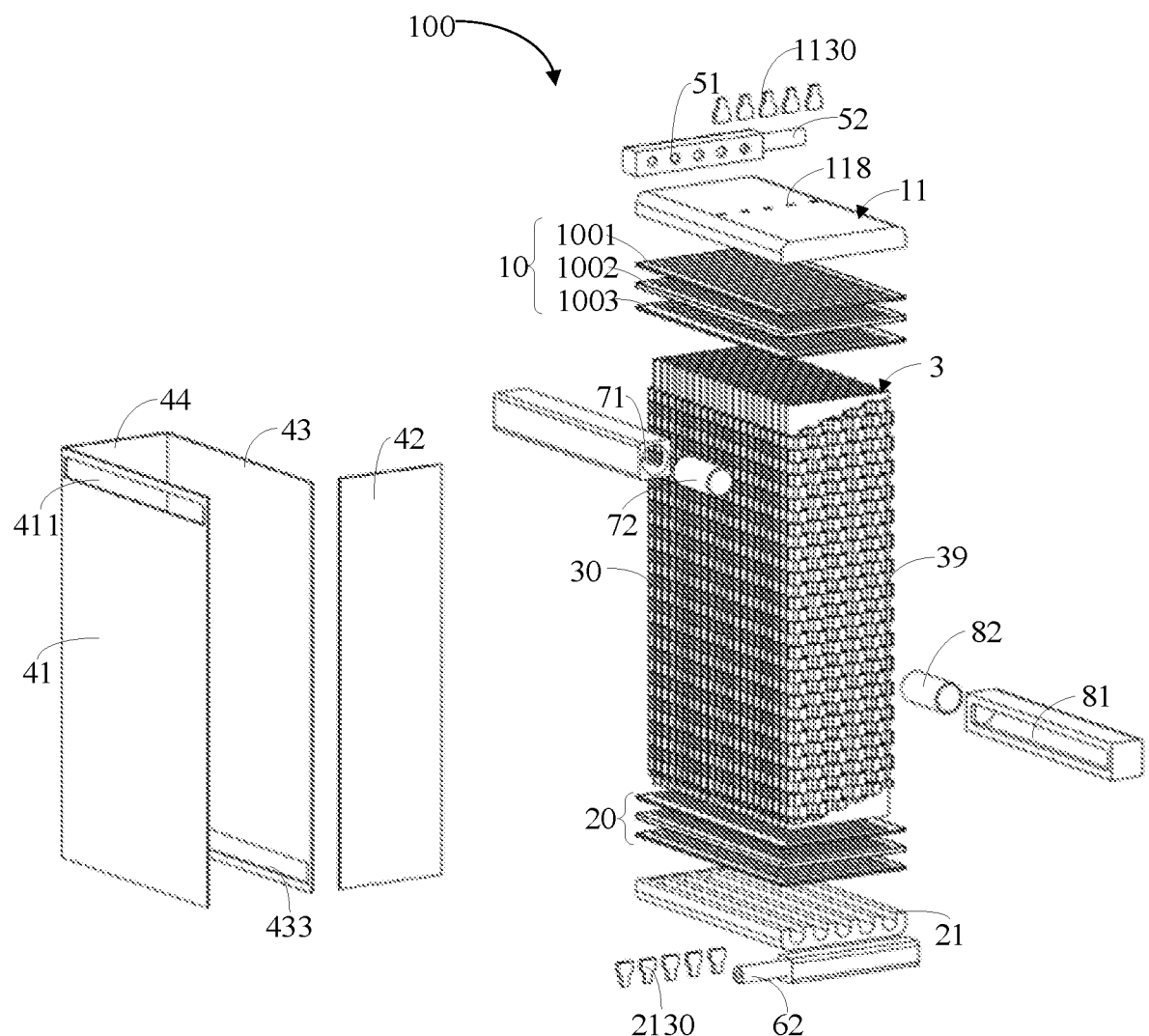
FIG. 29 is an exploded schematic view of the heat exchanger shown in FIG. 27.
Figure 30:
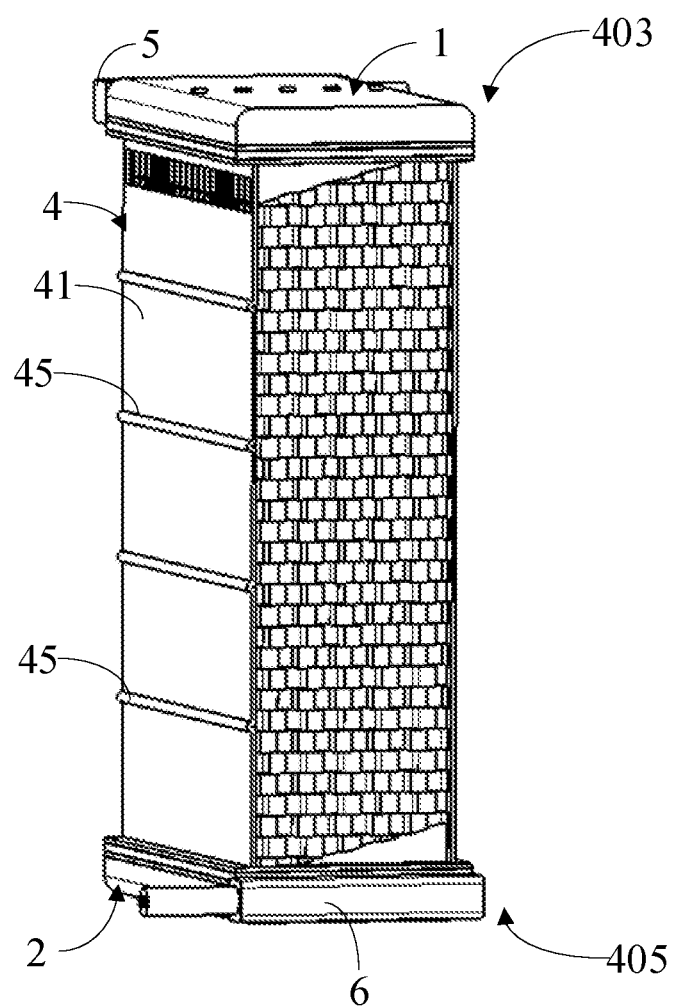
FIG. 30 is a partial structural view of another heat exchanger according to an exemplary embodiment of the present application.
Figure 31A:
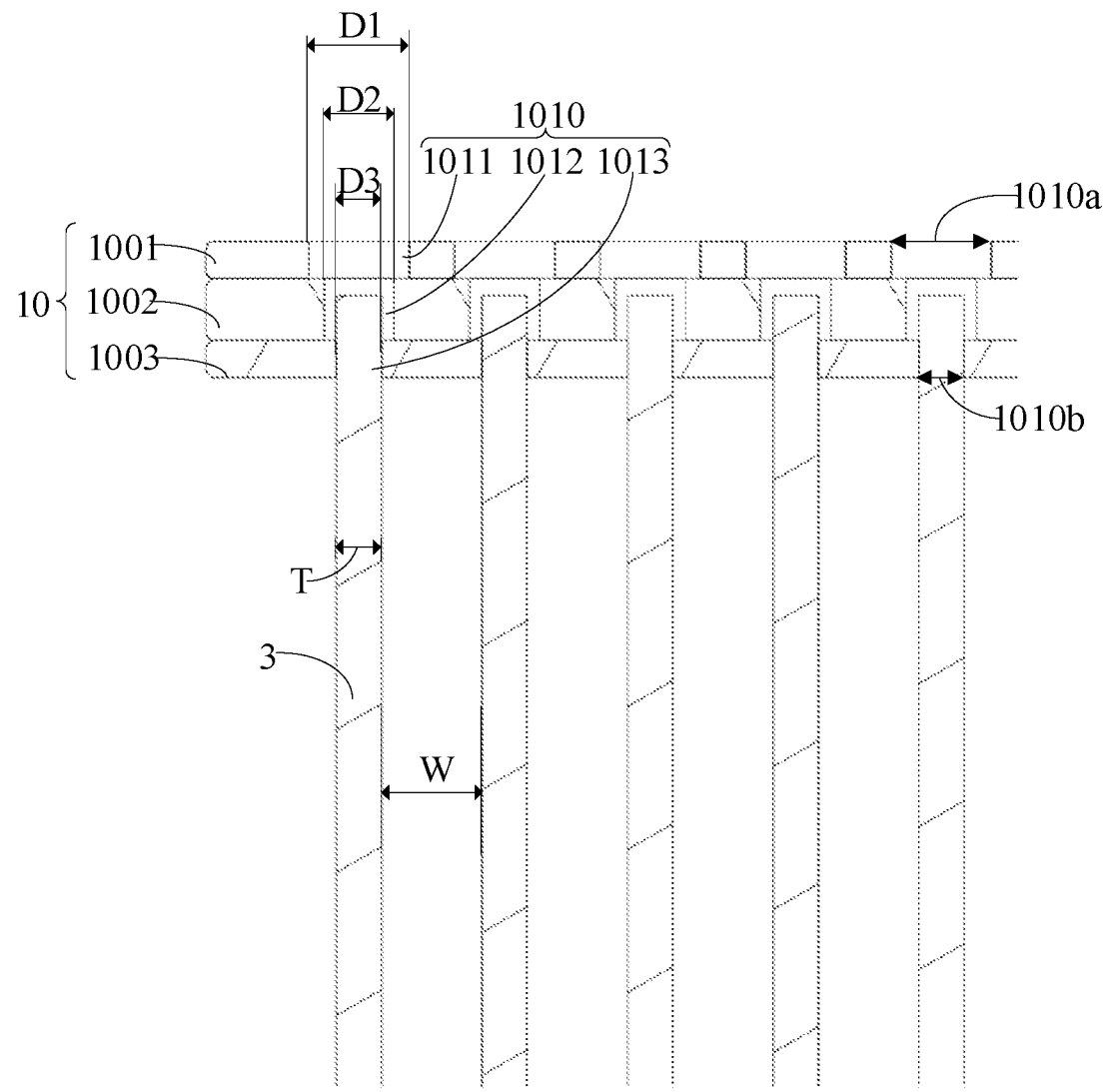
FIG. 31A is a schematic view of the installation structure of a flat tube and a bottom plate according to an exemplary embodiment of the present application.
Figure 31B:
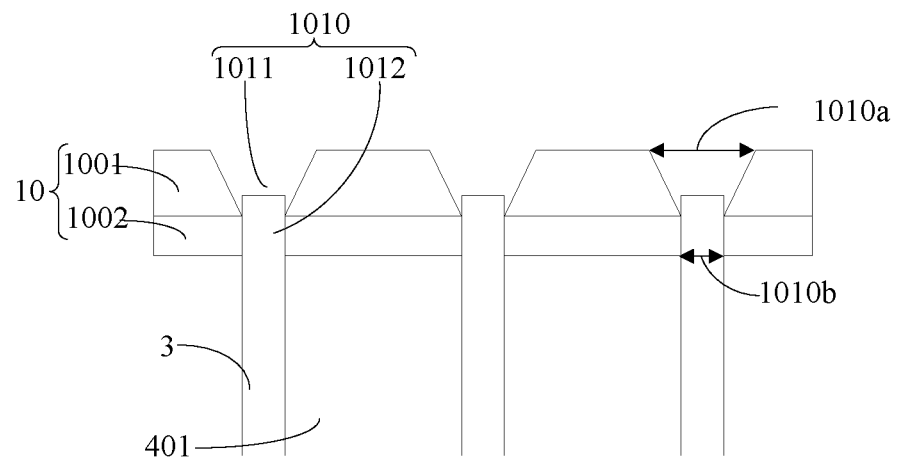
FIG. 31B is a schematic view of another installation structure of a flat tube and a bottom plate according to an exemplary embodiment of the present application.
Figure 32:
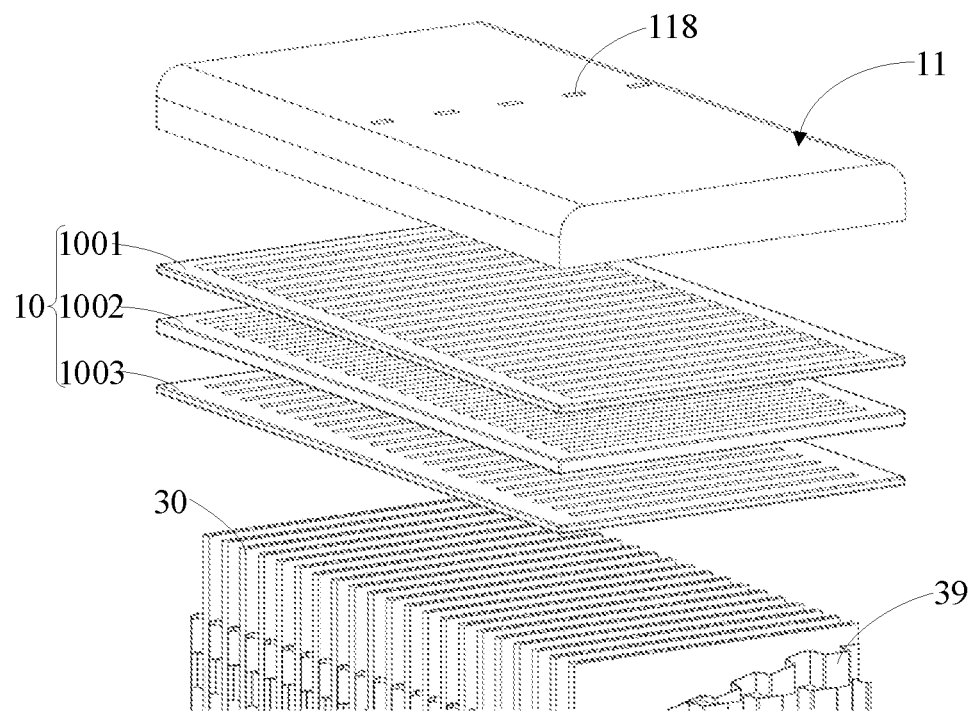
FIG. 32 is a partial structural view of the heat exchanger shown in FIG. 27.
Figure 33:
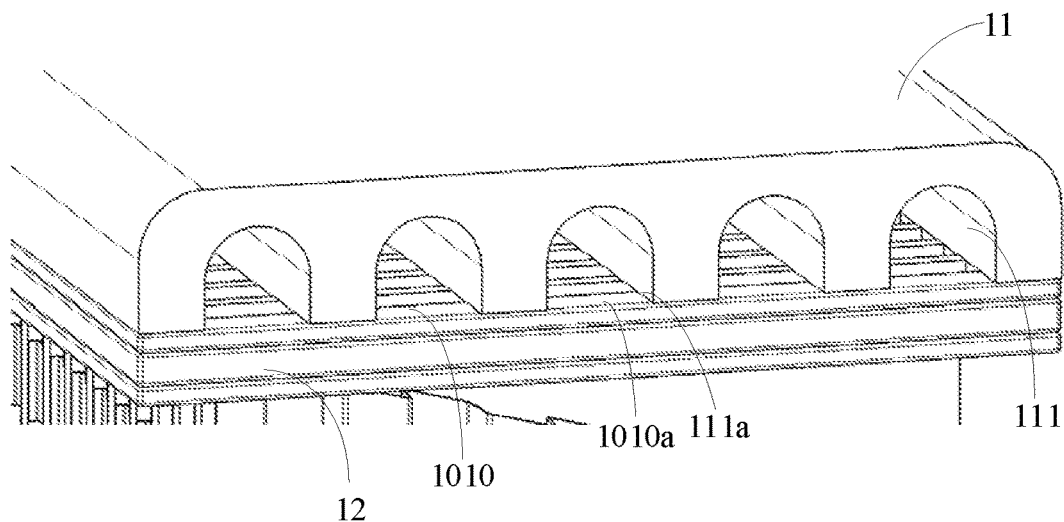
FIG. 33 is a partial structural schematic view of the heat exchanger shown in FIG. 27 from another perspective.
Figure 34:
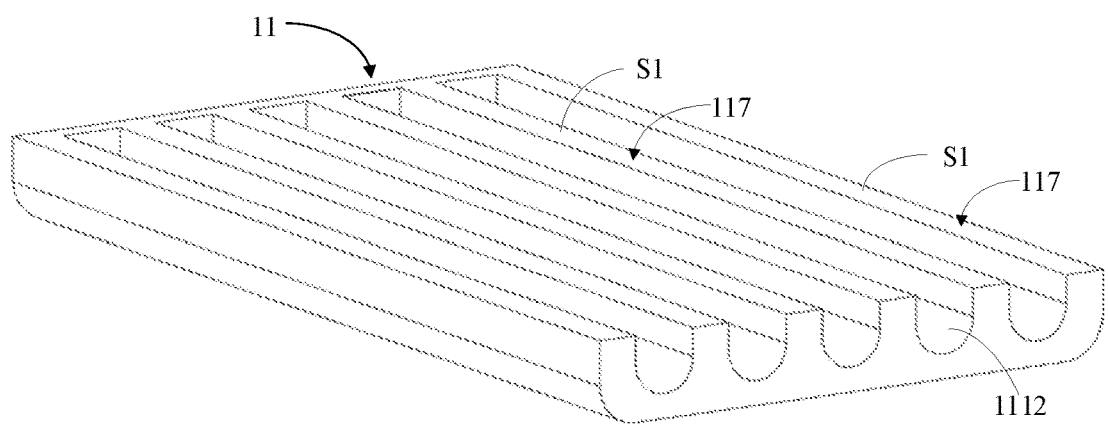
FIG. 34 is a schematic structural view of a cover plate according to an exemplary embodiment of the present application.
Figure 35:
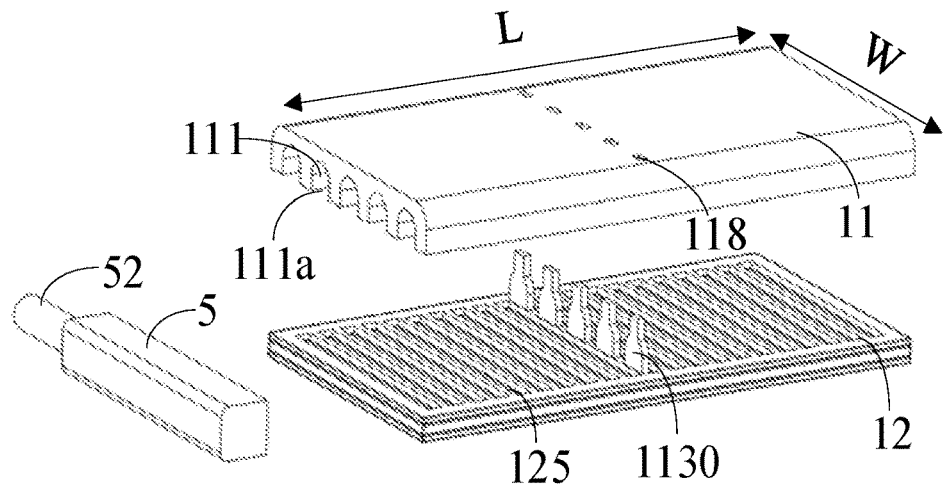
FIG. 35 is an exploded schematic view of a header box and a header of an exemplary embodiment of the present application.
Figure 36:
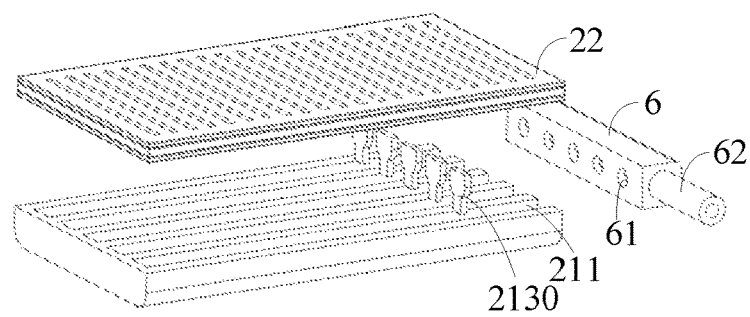
FIG. 36 is an exploded schematic view of another header box and headers according to an exemplary embodiment of the present application.

For example, the first bottom plate 10 includes a first plate-shaped member 1001 connected to the cover plate 11, a third plate-shaped member 1003 away from the cover plate, and a second plate-shaped member 1002 disposed between the first plate-shaped member 1001 and the third plate-shaped member 1003 (refer to FIGS. 29, 31 and 32). The first plate-shaped member 1001, the second plate-shaped member 1002, and the third plate-shaped member 1003 can be joined by welding. The elongated opening 1010 includes a first hole portion 1011, a second hole portion 1012 and a third hole portion 1013 (refer to FIG. 31). The first hole portion 1011 extends through the first plate-shaped member 1001, the second hole portion 1012 extends through the second plate-shaped member 1002, and the third hole portion 1013 extends through the third plate-shaped member 1003.

Alternatively, directions of the side walls of the third hole portion 1013, the second hole portion 1012 and the first hole portion 1011 extend in consistent with a length direction of the flat tube 30 (refer to FIG. 31).

Wherein a width D3 of the third hole portion 1013 is equal to a thickness T of the flat tube, so as to ensure that the flat tube fits with the third hole portion 1013, and prevent the first heat exchange medium from leaking out of the header box. A width D2 of the second hole portion 1012 is greater than the width D3 of the third hole portion 1013. For example, D2=1.5*D3. A width D1 of the first hole portion 1011 is greater than or equal to the width D2 of the second hole portion 1012. For example, D1=1.5*D2. Taking a range of thickness T from 1.5 mm to 2.5 mm as an example, a size range of the width D1 of the first hole portion 1011 may be approximately in a range of 3.375 mm to 5.625 mm.

Of course, the opening 1010 may not be a stepped hole. For example, the opening 1010 is substantially trumpet-shaped (refer to FIG. 31B). The first bottom plate 10 is formed by welding the first plate-shaped member 1001 and the second plate-shaped member 1002. The opening 1010 includes a first hole portion 1011 and a second hole portion 1012. Among them, the first hole portion 1011 extends through the first plate-shaped member 1001 and the second hole portion 1012 extends through the second plate-shaped member 1002. The first hole portion 1011 has a substantially trumpet shape, and an end with a larger opening of the first hole portion 1011 is closer to the cover plate 11 than another end with a smaller opening.

Of course, for the heat exchanger of which an end of the flat tube has been narrowed, the width D3 of the third hole portion 1013 is smaller than the thickness T of the flat tube in order to ensure that the flat tube and the third hole portion 1013 are fitted together.

The end of the flat tube 30 extends through the third hole portion 1013 and is closer to the cover plate 11 than the third hole portion 1013. For example, the end of the flat tube 30 is located in the second hole portion 1012, so that a gap is formed between the outer wall surface of the flat tube 30 and the inner wall surface of the second hole portion. The solder between the third plate-shaped member 1003 and the second plate-shaped member 1002 can be effectively prevented from clogging the opening of the flat tube 30.

One end of the flat tube 30 is communicated with an interior of the header box 1 through the elongated opening 1010. Similarly, the second header box 2 has a bottom plate 20 and a cover plate 21, and the bottom plate of the second header box 2 is provided with a corresponding elongated hole for the other end of the flat tube 30 to be inserted, so that the flat tube 30 is communicated with the interior of the second header box 2. The structure of the second header box 2 is basically the same as that of the first header box 1. For details, please refer to the relevant description of the first header box 1.

Further, two ends of the casing 4 are provided with headers for the first heat exchange medium to flow into and flow out of the header box. A first end 403 of the casing 4 is provided with a first header 5, and a second end 405 is provided with a second header 6. The first header 5 is communicated with the first header box 1, and the second header 6 is communicated with the second header box 2. Specifically, along the length direction L of the cover plate 11, one end of the groove 111 is blocked, and the other end has an opening 1112. The opening 1112 is connected to the first header 5 which collects or distributes the first heat exchange medium. Correspondingly, a side of the first header 5 facing the first header box 1 is provided with a header hole 51 corresponding to the opening 1112 for the first heat exchange medium to enter and exit the first header box 1 (refer to FIGS. 34 and 35). The structure of the groove 211 on the cover plate 21 of the second header box 2 is basically the same as that of the groove 111. Correspondingly, the second header 6 is provided with a corresponding header hole 61 for the first heat exchange medium to enter and exit the second header box 2 (refer to FIGS. 29 and 36).

One end of the first header 5 is sealed, and the other end is provided with a first external pipe 52 for the first heat exchange medium to flow into the first header 5 or flow out of the first header 5. One end of the second header 6 is sealed, and the other end is provided with a second external pipe 62 corresponding to the first heat exchange medium to flow out of the second header 6 or flow into the second header 6.

Alternatively, the first header 5 and the second header 6 are arranged diagonally outside of the casing 4, which makes the distribution of the first heat exchange medium more uniform and improves the heat exchange effect. As a result, the first heat exchange medium and the second heat medium form countercurrent heat exchange, which makes the heat exchange between the two more sufficient. It can be set according to application environment, which is not limited in this application.

It should be noted that for the embodiment where only one of the two ends of the casing is provided with a header box, in which one header is communicated with the chamber of the casing through the header box, and the other header can be directly communicated with the chamber of the casing.

Further, the cover plate 11 of the first header box 1 is provided with a partition plate 1130. A lower end surface of the partition plate 1130 abuts against an upper surface of the first bottom plate 10 so as to divide the groove 111 into at least two mutually isolated chambers 15 and 16. For example, the cover plate 11 may be provided with a row of first partition holes 118 in which a partition plate 1130 is inserted to divide the groove 111 into two mutually isolated chambers 15 and 16 (that is, an internal space of the first header box 1 is divided into two mutually isolated chambers 15 and 16) (refer to FIGS. 28, 29, 35, 37 and 38). The first partition hole 118 is provided along the width direction W of the cover plate 11 so that the chamber 15 and the chamber 16 are distributed along the length direction L of the cover plate 11. The cover plate 21 may also be provided with a partition plate 2130, an upper end surface of the partition plate 2130 abuts against a lower surface of the bottom plate 20 so as to divide the groove 211 of the second header box 2 into two mutually isolated chambers 25 and 26. The cover plate 21 may also be provided with a row of second partition holes (not shown) for inserting the partition plate 2130. For details, reference may be made to the relevant description of the cover plate 11, which will not be repeated here.

Figure 37:
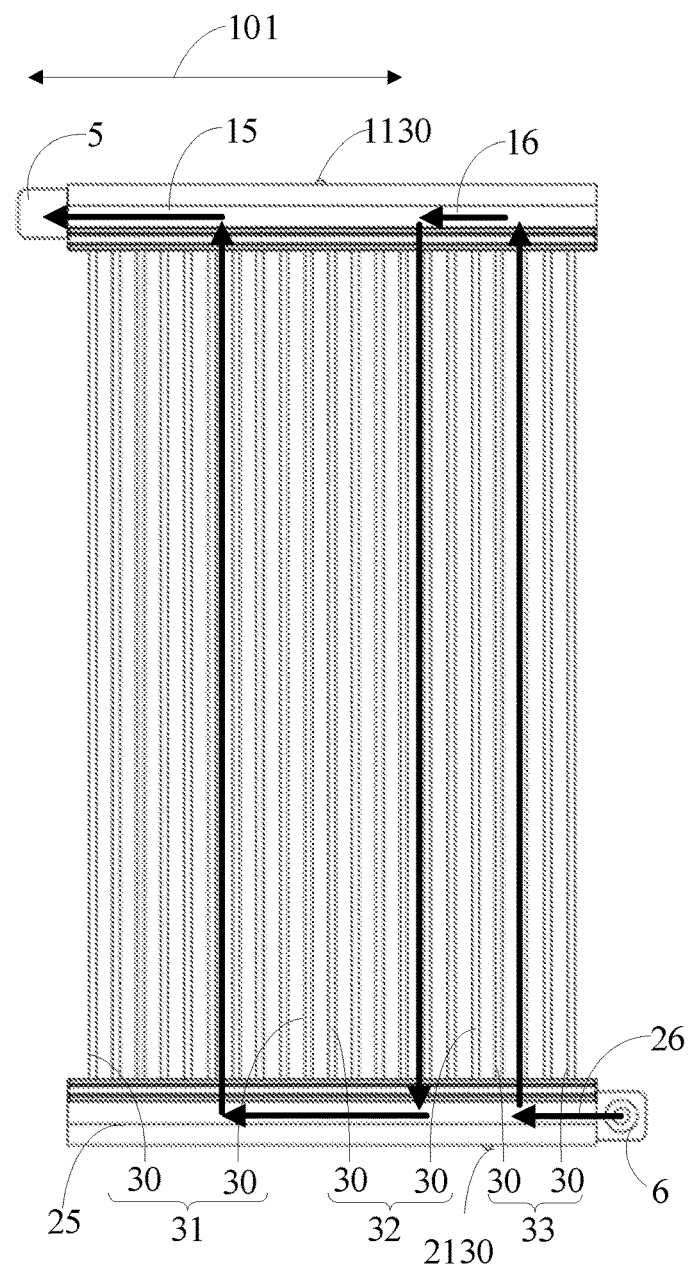
FIG. 37 is a schematic structural view of the heat exchanger shown in FIG. 27 in a working mode.
Figure 38:
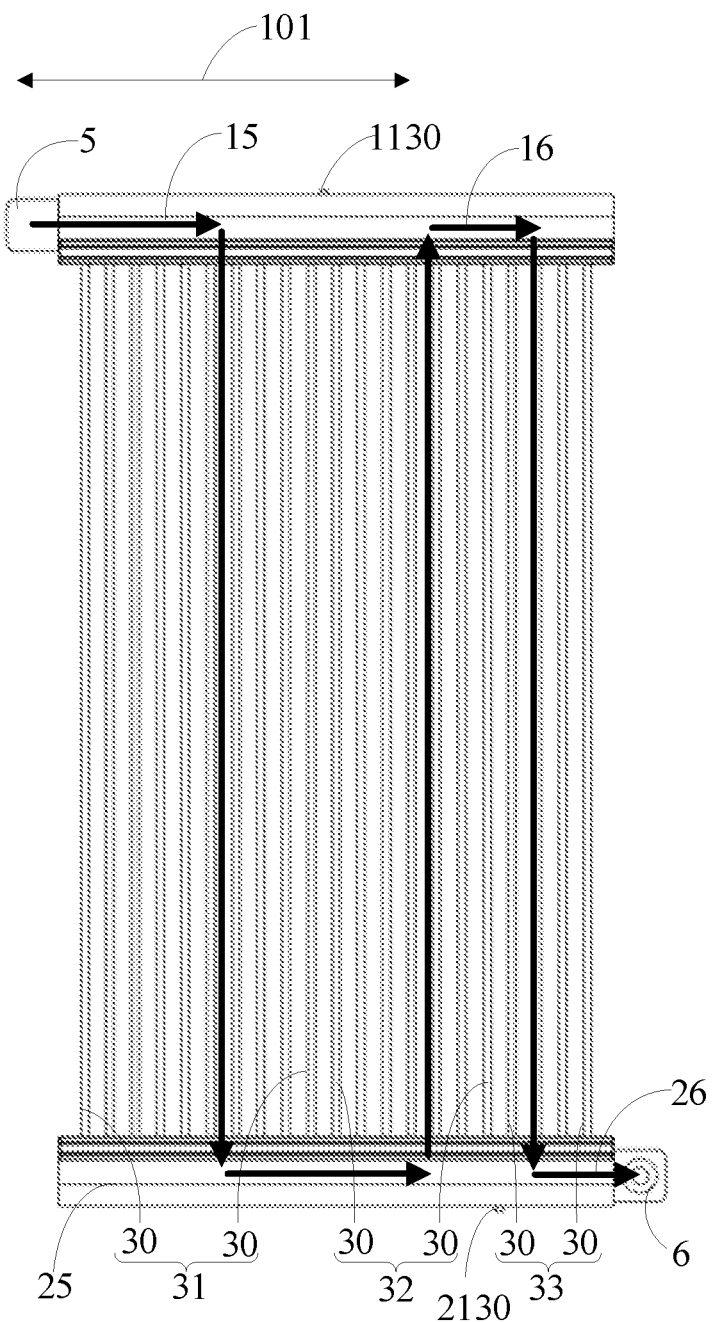
FIG. 38 is a schematic structural view of the heat exchanger shown in FIG. 27 in another working mode.
Figure 39A:
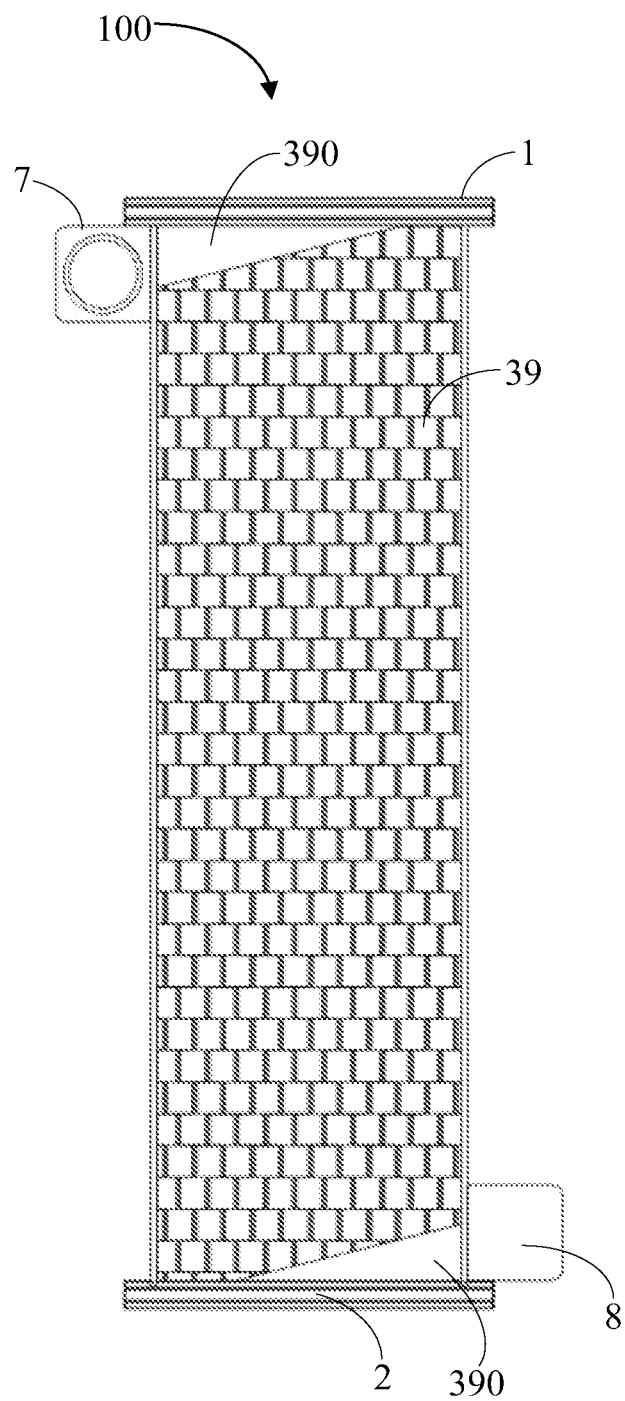
FIG. 39A is a schematic structural view of a heat exchanger with flow channels according to an exemplary embodiment of the present application.
Figure 39B:
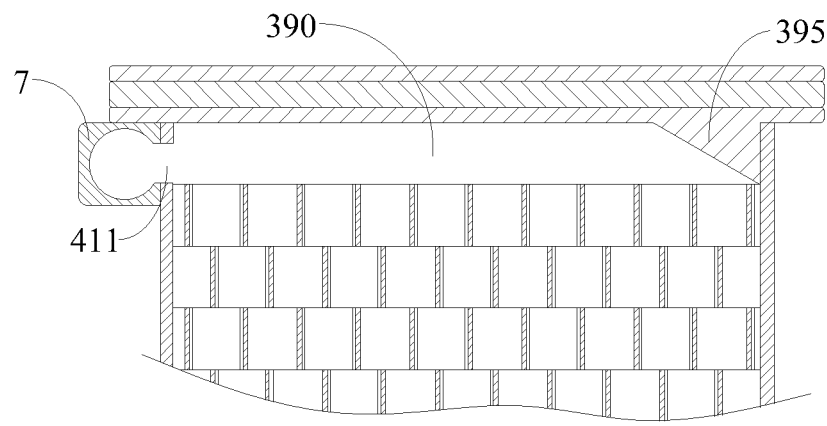
FIG. 39B is a partial structural schematic view of a heat exchanger with another flow channels according to an exemplary embodiment of the present application.
Figure 39C:
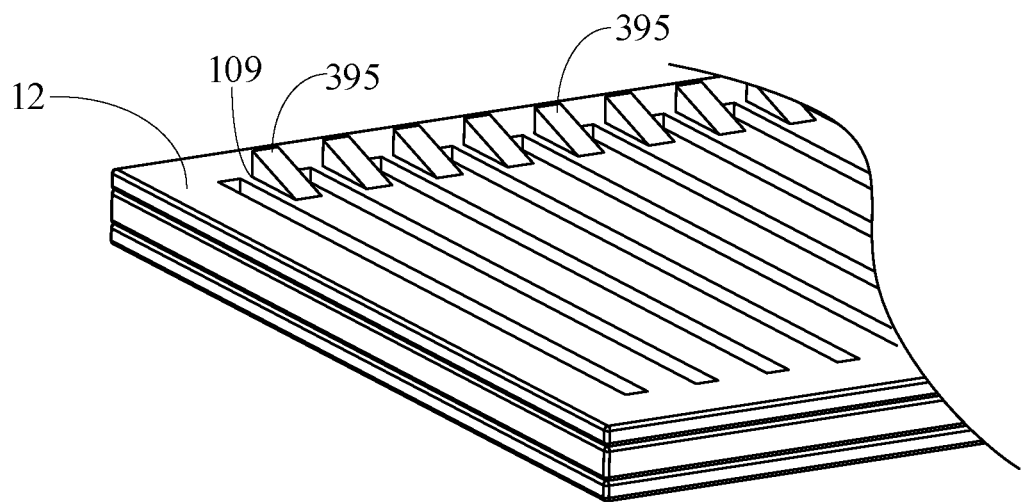
FIG. 39C is a partial structural view of the heat exchanger of FIG. 39B.
Figure 39D:
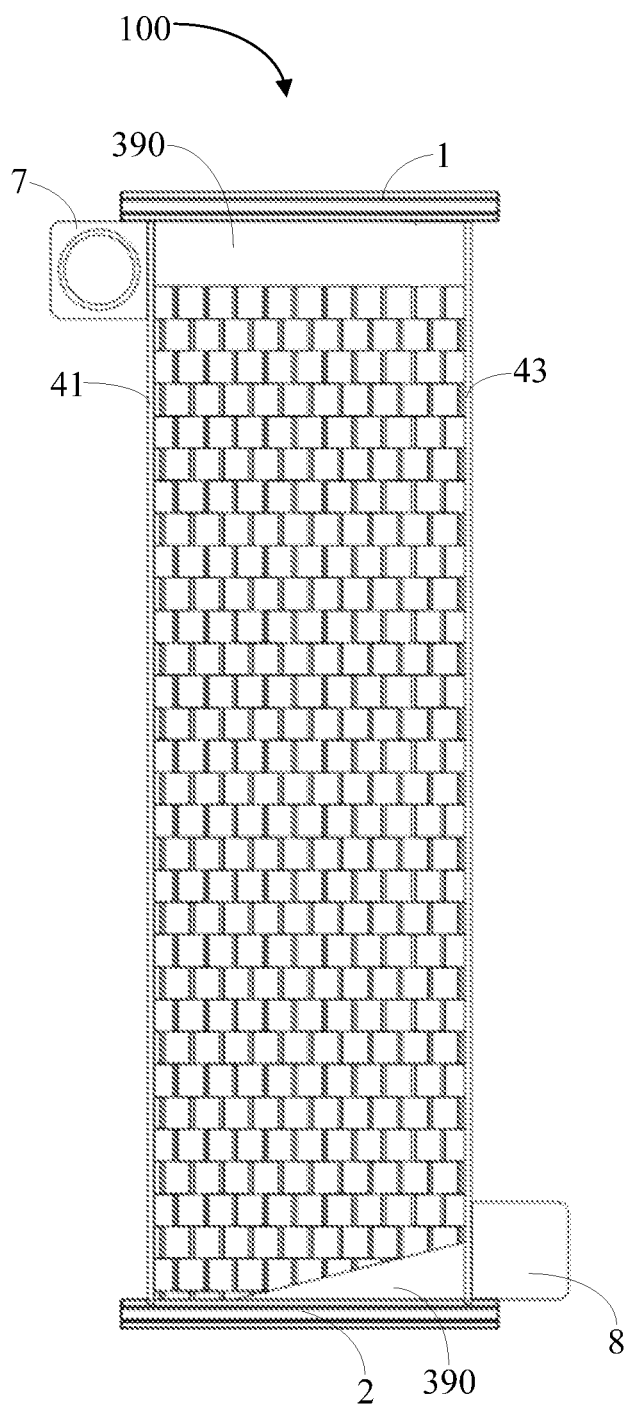
FIG. 39D is a schematic structural view of a heat exchanger with another flow channels according to an exemplary embodiment of the present application.
Figure 39E:
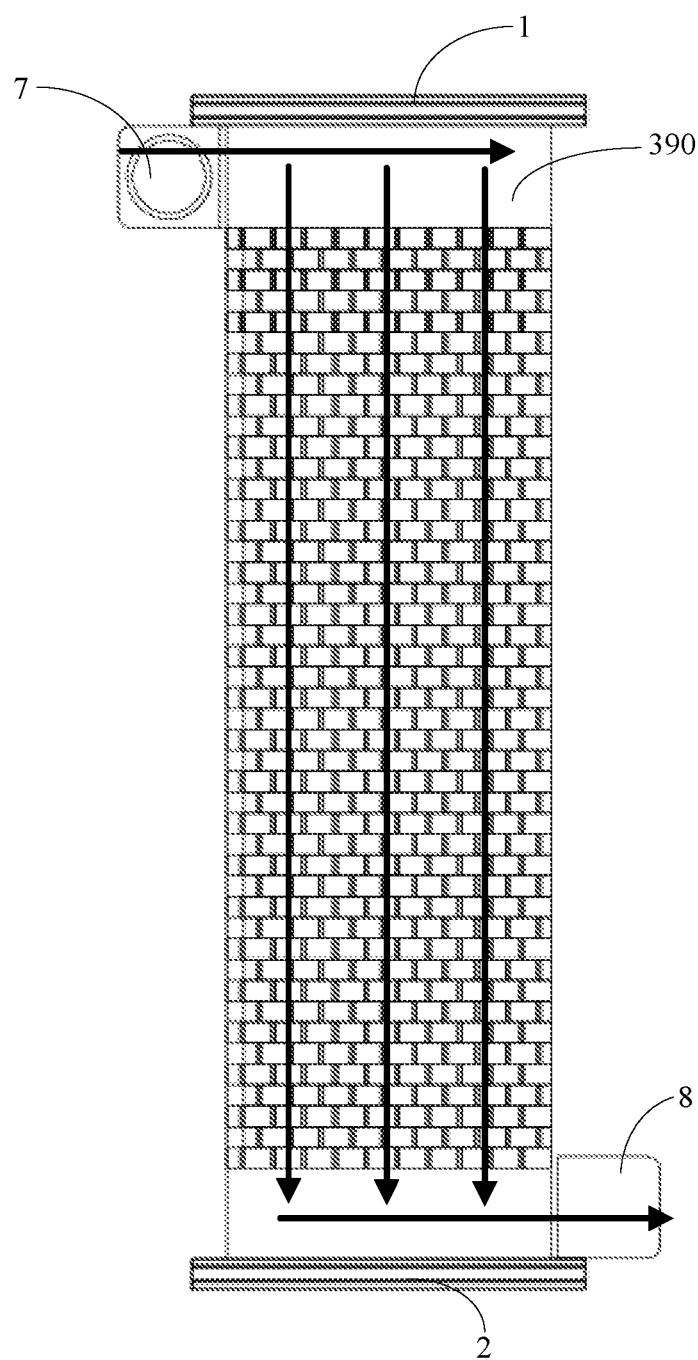
FIG. 39E is a schematic structural view of a heat exchanger with another flow channels according to an exemplary embodiment of the present application.

Further, the first partition hole 118 and the second partition hole are juxtaposed along the stacking direction of the flat tubes 30 (that is, they are staggered along a direction indicated by the directional arrow 101 shown in FIG. 37). In other words, the partition plate 1130 and the partition plate 2130 are staggered along the stacking direction of the flat tubes 30 (refer to FIGS. 37 and 38), so that the plurality of flat tubes 30 can be divided into a first tube group 31 communicating with the chamber 15 and the chamber 25, a second tube group 32 communicating with the chamber 25 and the chamber 16, and a third tube group 33 communicating with the chamber 16 and the chamber 26. As a result, the flow of the first heat exchange medium is increased, which is beneficial to increase the flow rate of the first heat exchange medium, thereby improving the heat exchange efficiency of the heat exchanger.

In order to further facilitate the circulation of the first heat exchange medium, the number of flat tubes included in the first tube group 31, the second tube group 32 and the third tube group 33 is different. For example, the number N1 of flat tubes in the first tube group 31, the number N2 of flat tubes in the second tube group 32, and the number N3 of flat tubes in the third tube group 33 may meet the following relationship: N1>N2>N3. As another example, N1:N2:N3=10:7:4.

When the heat exchanger is working under an evaporator working mode, the first heat exchange medium enters from the first header 5 and flows out of the second header 6 after heat exchange. The specific flow direction of the first heat exchange medium can be referred to the directional lines in FIG. 38. When the heat exchanger is working under a condenser working mode, the first heat exchange medium enters from the second header 6 and flows out of the first header 5 after heat exchange. The specific flow direction of the first heat exchange medium can be referred to the directional lines in FIG. 37. As a result, the flow of the first heat exchange medium in the heat exchanger is increased, and the flow speed of the first heat exchange medium is increased as well.

It should be noted that the cover plate 11 may be provided with a row of first partition holes. Of course, multiple rows of the first partition holes may be provided to divide the groove of the first header box 1 into more mutually isolated chambers in order to further increase the flow of the first heat exchange medium. Correspondingly, the cover plate 21 of the second header box 2 can also be provided with a row of second partition holes or multiple rows of second partition holes. In addition, only one of the cover plate 11 and the cover plate 21 may be provided with a row of partition holes, while the other is not provided with partition holes. This application does not limit this.

The number of rows of the partition holes provided in the cover plate 11 and the cover plate 21 may be the same or different. This application does not limit this, which can be determined according to specific application environment.

The heat exchange channel 401 is provided with a heat dissipation member 39 which may be heat exchange fins, such as saw-tooth heat exchange fins, corrugated heat exchange fins, or the like. Wherein the heat dissipation member 39 can be fixedly disposed on the bottom plate of the header box through the end portion, or fixedly disposed on the bottom of the header box through the limiting member, or fixedly mounted on the flat tube by brazing, or the like.

Between the end of the heat dissipation member 39 and the end surfaces of the header boxes 1, 2 close to the core 3, a flow channel 390 is provided for circulation of the second heat exchange medium. The flow channel 390 is communicated with the opening sections 411, 433. As a result, flow resistance to the second heat exchange medium is reduced, and flow speed and uniformity of the second heat exchange medium are improved.

Figure 40A:
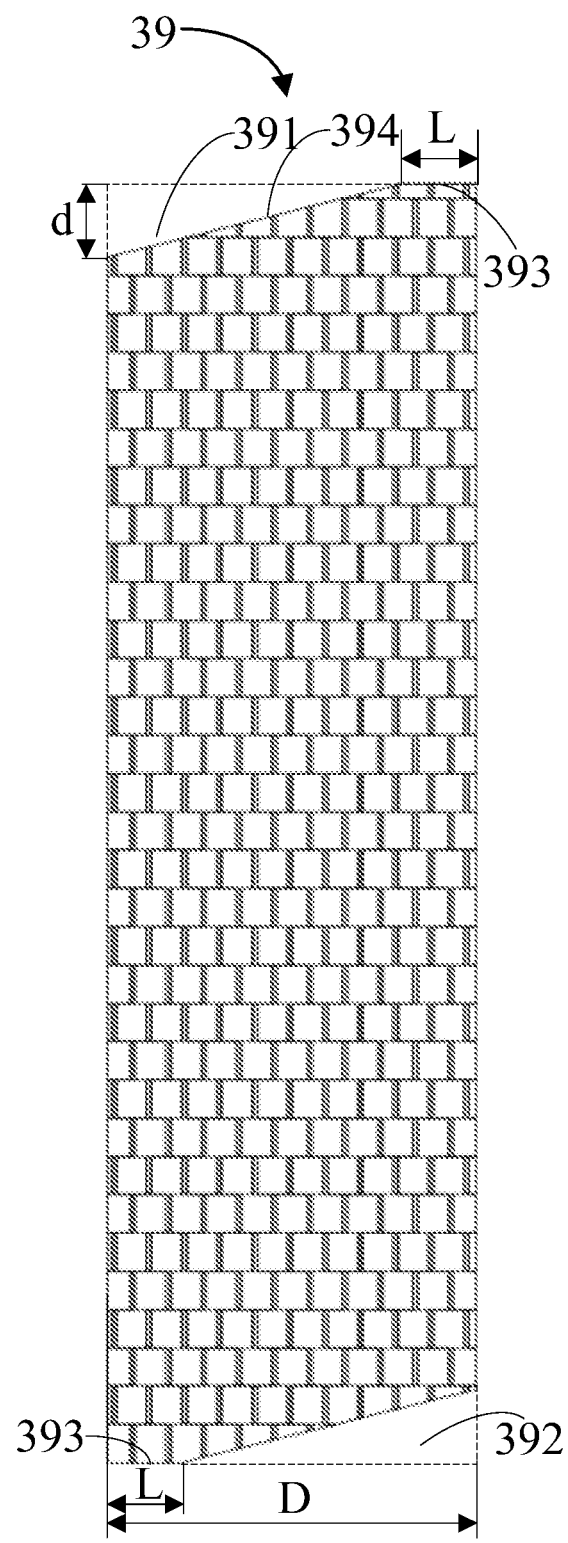
FIG. 40A is a schematic structural view of a heat dissipation member according to an exemplary embodiment of the present application.
Figure 40B:
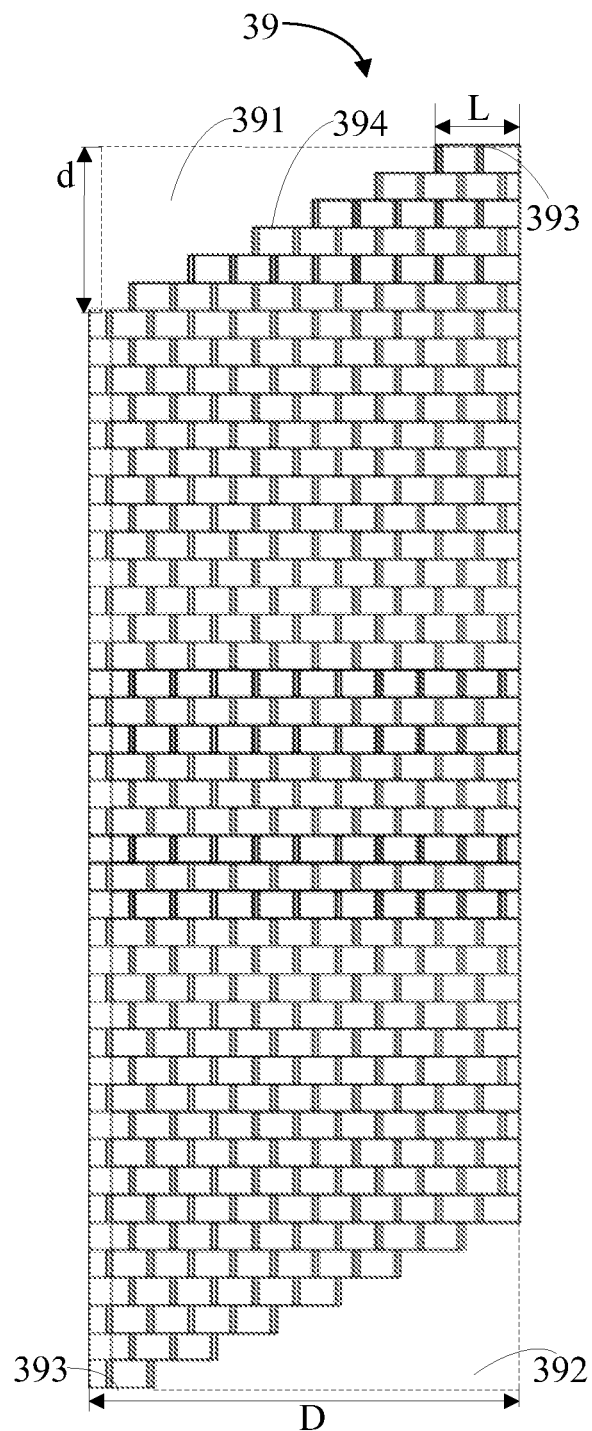
FIG. 40B is a schematic structural view of another heat dissipation member according to an exemplary embodiment of the present application.
Figure 40C:
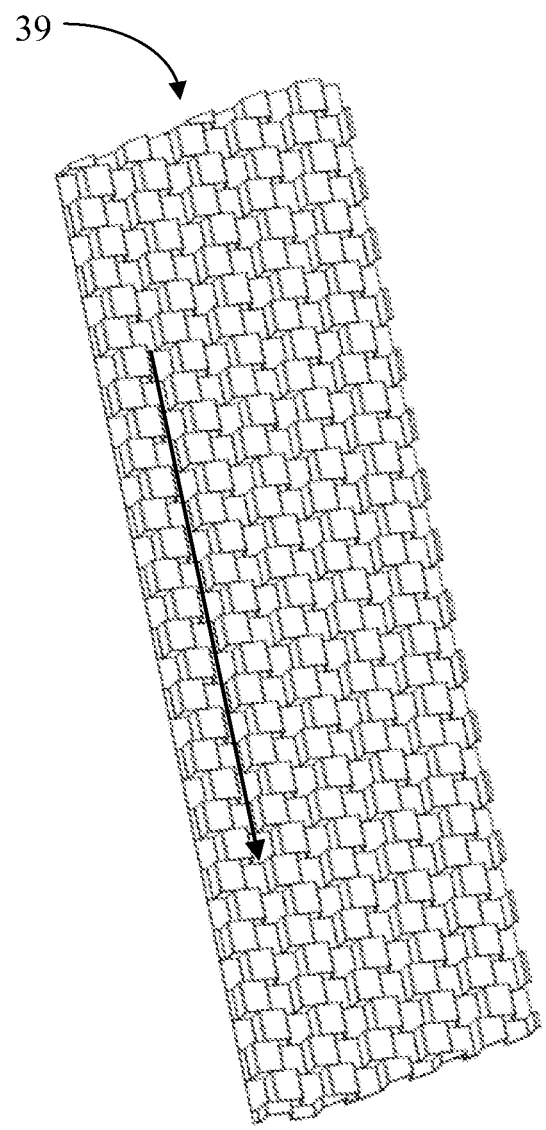
FIG. 40C is a three-dimensional structural view of the heat dissipation member shown in FIG. 40A.
Figure 40D:
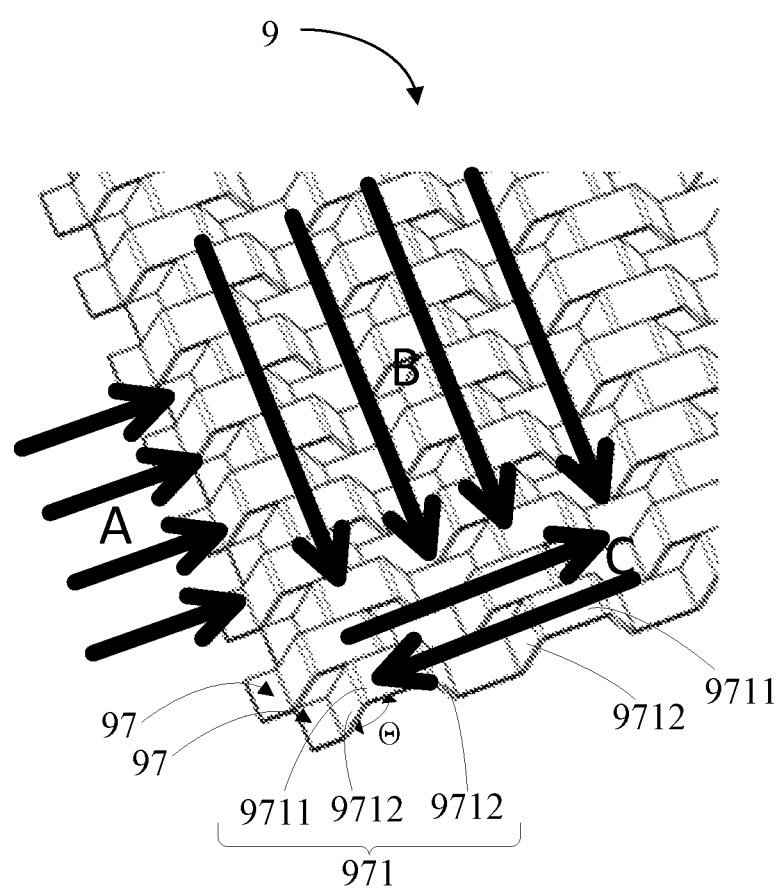
FIG. 40D is a partial structural view of the heat dissipation member shown in FIG. 40C.

Taking a saw-tooth heat exchange fin as an example, the heat dissipation member 39 is composed of two or more racks 97 which are arranged in parallel (refer to FIGS. 40A, 40C and 40D). The rack 97 includes two or more convex frames 971 arranged at intervals. The convex frame 971 includes a convex frame top 9711 and folding plates 9712 connected to both ends of the convex frame top 9711, respectively. The angle Θ between the folding plate 9712 and the convex frame top 9711 is greater than 90°, so that a cross-section of the convex frame 971 may be substantially trapezoidal. In addition, the convex frames of adjacent racks are staggered along a rack length direction (a direction indicated by arrow C in FIG. 40D and its opposite direction). With the heat dissipation member of this structure, the second heat exchange medium flows along a direction shown by arrow B in FIG. 40D or its opposite direction, which destroys the boundary layer between the second heat exchange medium and the heat dissipation member 39, increasing the perturbation of the heat exchange medium, thereby increasing the heat transfer coefficient of the second heat exchange medium on the surface of the heat dissipation member 39. In addition, compared with the case where the second heat exchange medium flows along other directions, such as a direction indicated by arrow A, the resistance of the heat exchange fins to the flow of the second heat exchange medium is reduced to a greater extent.

In some embodiments, the heat dissipation member 39 has a notch 391 on a side adjacent to the opening section 411, and a notch 392 on a side adjacent to the opening section 433 (refer to FIGS. 28 to 30 and FIGS. 39A to 40D). The notches 391 and 392 form a flow channel 390 for circulation of the second heat exchange medium, so that the chamber 40 can communicate with the opening sections 411, 433 to reduce the flow resistance to the second heat exchange medium.

The height of the side of the flow channel 390 adjacent to the opening section 411 is greater than the height of the side away from the opening section 411. The height d of the end of the flow channel 390 adjacent to the opening section 411 and the width D of the heat dissipation member 39 meet the condition: $0.15D \leq d \leq 0.25D$, in order to ensure the inflow of the second heat exchange medium and the effective heat exchange area of the heat dissipation member 39. Preferably, the value of d is 0.2D.

The heat dissipation member 39 includes a body portion. Part of the body portion extends toward two ends to form a limiting portion 393 to facilitate positioning of the heat dissipation member 39 and to ensure the size of the heat dissipation member 39. The limiting portion 393 is located on a side away from the opening section 411. Wherein the corresponding end of the heat dissipation member 39 at the notch portion 391 has an inclined edge 394 (see FIG. 40A), and the corresponding end of the heat dissipation member 39 at the notch 392 also has an inclined edge. Alternatively, the end surface of the limiting portion 393 is a straight edge. Wherein the length L of the end surface may be approximately in a range of 5 mm to 10 mm, to ensure the fixing of the heat dissipation member 39 and the flow of the second heat exchange medium.

In addition, the inclined edge 394 may be a straight edge (see FIG. 40A). Of course, the inclined edge 394 may also be a stepped edge (see FIG. 40B), an arc-shaped edge, or the like. This application does not limit this, which can be set according to specific application environment.

Shape of the notch 392 may be substantially the same as the notch 391. For details, please refer to the related description of the notch 391, which will not be repeated here.

In other embodiments, the end of the heat dissipation member 39 may be substantially straight. The upper end of the heat dissipation member 39 is located substantially below the opening section 411 of the side wall to form the flow channel 390, thereby ensuring the smooth flow of the second heat exchange medium into the chamber 40. That is to ensure that the second heat exchange medium flows smoothly into the heat exchange channel 401 (refer to FIGS. 39B, 39D and 39E).

In some embodiments, a limiting member 395 is provided on one side of the first or second header box 1, 2 adjacent to the core 3. One end of the limiting member 395 abuts against the end of the heat dissipation member 39, and the other end is disposed on the first or second header box 1, 2. At the same time, the limiting member 395 is partially or entirely located on the side of the flow channel 390 away from the opening section 411, 433. The end of the heat dissipation member 39 is substantially straight, then a flow channel 390 for circulation of the second heat exchange medium is formed between the header box and the end of the heat dissipation member, so that the chamber 40 can be communicated with the opening section 411, 433 in order to reduce the flow resistance to the second heat exchange medium. Specifically, the second bottom plate 12 is provided with a slot 109 for inserting the limiting member 395. The slot 109 is located at an end of the second bottom plate 12 away from the opening section 411, and the slot 109 is located between adjacent elongated openings 1010. An extending direction of the slot 109 may be the same as the extending direction of the elongated opening 1010, or may be different. The extending length of the slot 109 is smaller than the extending length of the elongated opening 1010. When the limiting member 395 is inserted into the slot 109, the end of the limiting member 395 connected to the second bottom plate 12 may extend beyond the second bottom plate 12 and extend toward the side away from the cover plate 11, or may not extend beyond the second bottom plate 12.

The limiting member 395 may be an independent component, and may be disposed on the second bottom plate 12 by welding. Of course, the limiting member 395 can also be provided integrally with the second bottom plate 12.

The limiting member 395 may have various shapes. For example, a cross-sectional surface of the limiting member 395 may be one of a triangular shape, a rectangular shape, a semicircular shape and an oval shape, or a combination of multiple shapes.

It should be noted that the two flow channels 390 at opposite ends of the heat dissipation member 39 may be substantially the same (refer to FIG. 39A) or different (refer to FIG. 39D), and can be set according to specific application environment, which is not limited by the present application.

It should be noted that the heat dissipation member 39 can also be directly fixed to the flat tube, and does not need to be arranged through the limiting member.

Further, the relationship between the width W of the heat exchange channel 401 and the thickness T of the flat tube 30 meets the condition: $2T \leq W \leq 3.25T$. In order to achieve a better heat exchange effect between the second heat exchange medium and the first heat exchange medium, taking the thickness T of the flat tube 30 in a range of 1.5 mm to 2.5 mm as an example, the width W of the heat exchange channel 401 is approximately in a range of 3 mm to 8.125 mm.

Figure 41A:
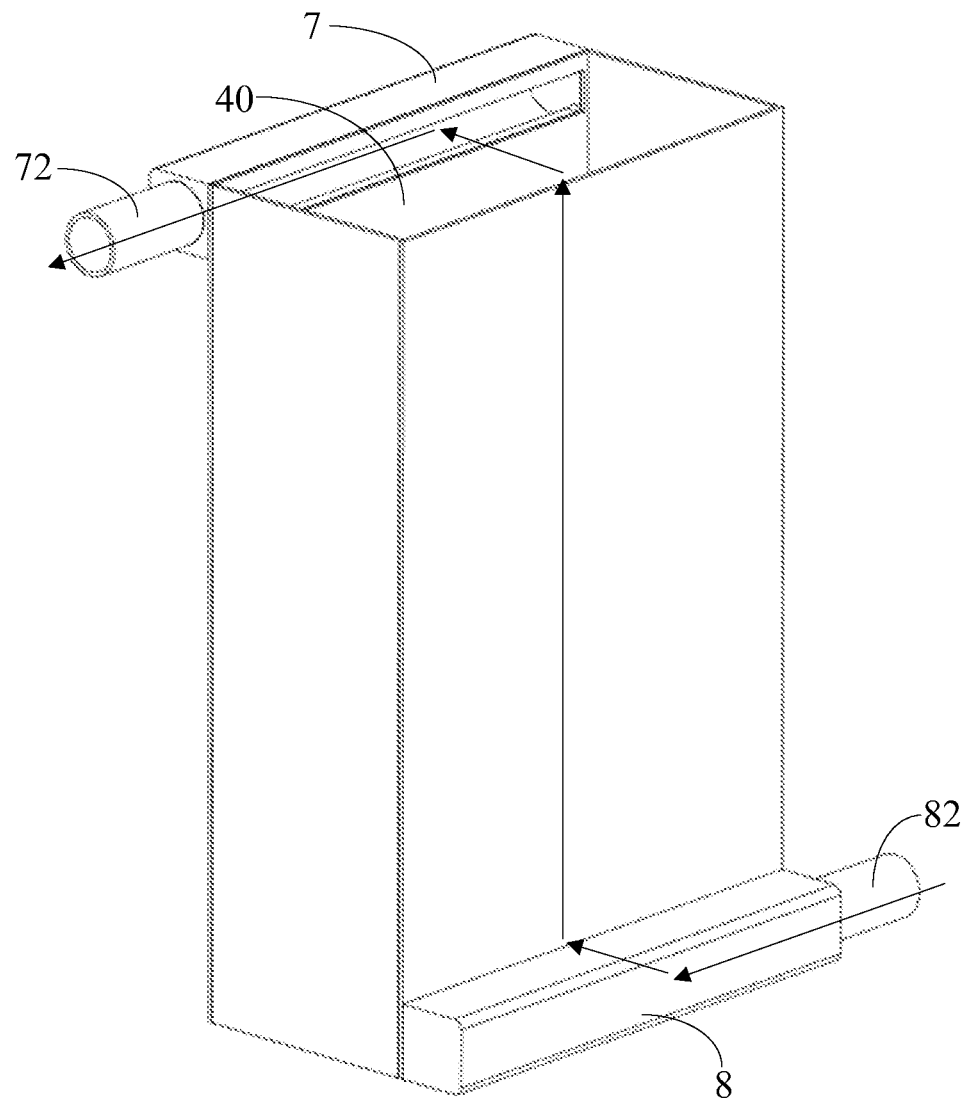
FIG. 41A is a structural view of an exemplary embodiment of the present application in which a casing and a collecting pipe are provided independently.
Figure 41B:
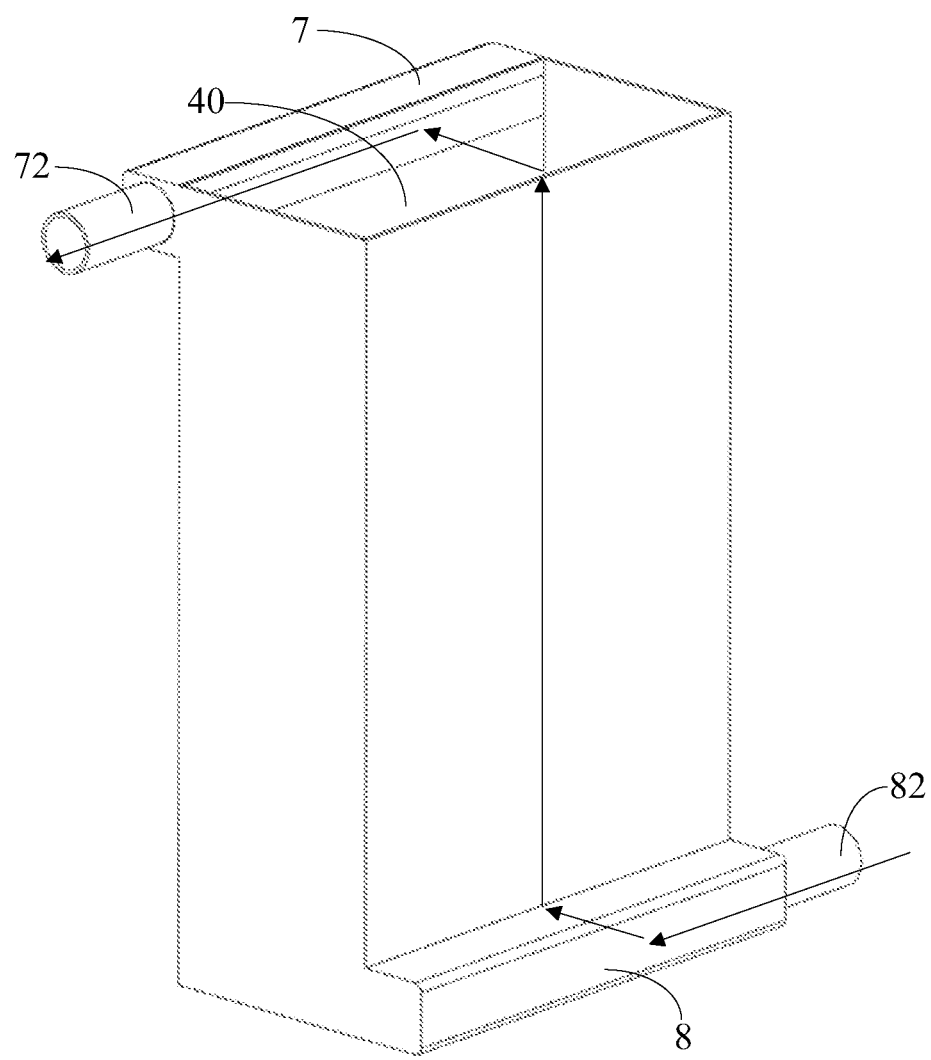
FIG. 41B is a structural view of an exemplary embodiment of the present application in which the casing and the collecting pipe are provided integrally.

The third header 7, the fourth header 8 and the casing 4 are independent components (refer to FIG. 41A). The side of the third header 7 adjacent to the casing 4 is provided with a hole 71 corresponding to the opening section 411, and the side of the fourth header 8 adjacent to the casing 4 is provided with a hole 81 corresponding to the opening section 433 for the second heat exchange medium to enter and exit the heat exchange channel 401. Of course, in some embodiments, the third and fourth headers 7, 8 and the casing 4 can also be integrally formed (see FIG. 41B).

One end of the third header 7 is sealed, and the other end is provided with a third external pipe 72 in order for the second heat exchange medium to flow into or out of the third header 7. One end of the fourth header 8 is sealed, and the other end is provided with a fourth external pipe 82 in order for the corresponding second heat exchange medium to the flow out of the fourth header 8 or to flow into the fourth header 8 (refer to FIG. 29). For example, the second heat exchange medium may flow into the fourth header 8 from the fourth external pipe 82, and then enter the heat exchange channel to exchange heat with the first heat exchange medium through the flat tube, then flow into the third header 7, and finally flow out from the third external pipe 72, as shown by the directed lines in FIG. 41A or FIG. 41B.

Figure 42:
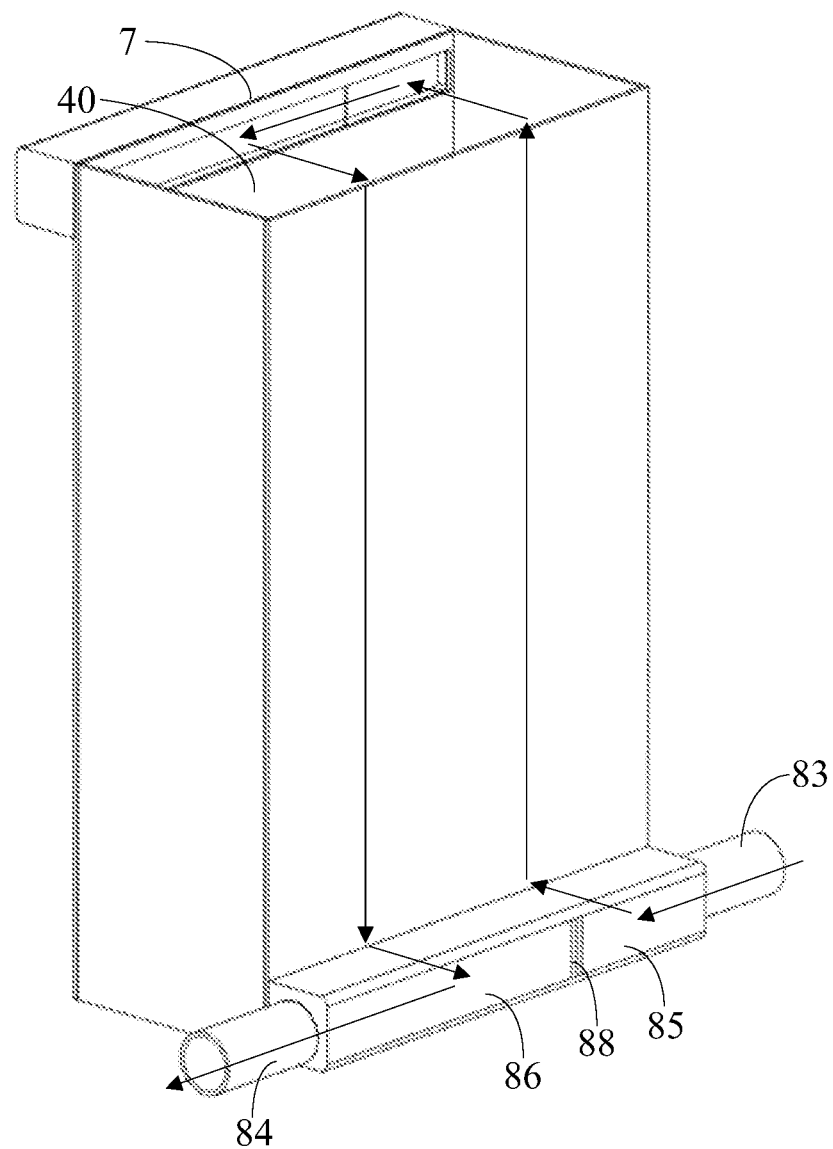
FIG. 42 is a schematic structural view of a multi-process casing and a collecting pipe according to an exemplary embodiment of the present application.

Of course, in some embodiments, two ends of the third header 7 are sealed, and fifth and sixth external pipes 83 and 84 are provided at both ends of the fourth header 8, respectively (refer to FIG. 42). Wherein the fourth header 8 is provided with a partition plate 88 to divide an internal space of the fourth header 8 into two header chambers 85 and 86 isolated from each other. Wherein the header chamber 85 is communicated with the fifth external pipe 83, and the header chamber 86 is communicated with the sixth external pipe 84, so that the second heat exchange medium can enter the corresponding heat exchange channel from the fifth external pipe 83. After changing the flow direction through the third header 7, it flows out of the sixth external pipe 84 after flowing through another part of the heat exchange channels, as shown by the directional lines in FIG. 42. It can be seen that with this arrangement, the heat exchange process of the second heat exchange medium can be increased, which is beneficial to increase the flow rate of the second heat exchange medium, thereby improving the heat exchange efficiency of the heat exchanger.

The third header 7 and the fourth header 8 are arranged diagonally outside of the casing 4 so that the second heat exchange medium and the first heat exchange medium can form countercurrent heat exchange, so that the heat exchange between the two is more sufficient. Of course, the third header and the fourth header can also be set in other ways, and can be set according to specific application environment, which is not limited in this application.

The above-mentioned casing 4 may include only side walls, and the bottom plates 10 and 20 of the header boxes 1 and 2 provided at two ends jointly form a sealed chamber together with the casing 4. Of course, the casing may also include an end wall (not shown) that can be closely attached to the bottom plate of the header box to form the chamber, and the end wall should be provided with a hole through which the flat tube extends. In case where only one of the first end and the second end is provided with a header box, the casing may be similarly provided.

Further, the casing 4 may be an integrally formed structure, or may include at least two plate members which are welded. For example, the casing 4 may include a first side wall 41, a second side wall 42, a third side wall 43 and a fourth side wall 44. Wherein the first side wall 41, the second side wall 42, the third side wall 43 and the fourth side wall 44 may be a whole, or may be divided into at least two independent parts. If the casing is formed by splicing at least two plates, there are overlapping parts at the splice to ensure the welding area and increase the strength of the casing (refer to FIGS. 43A, 43B, 43C and 43D).

Figure 43A:
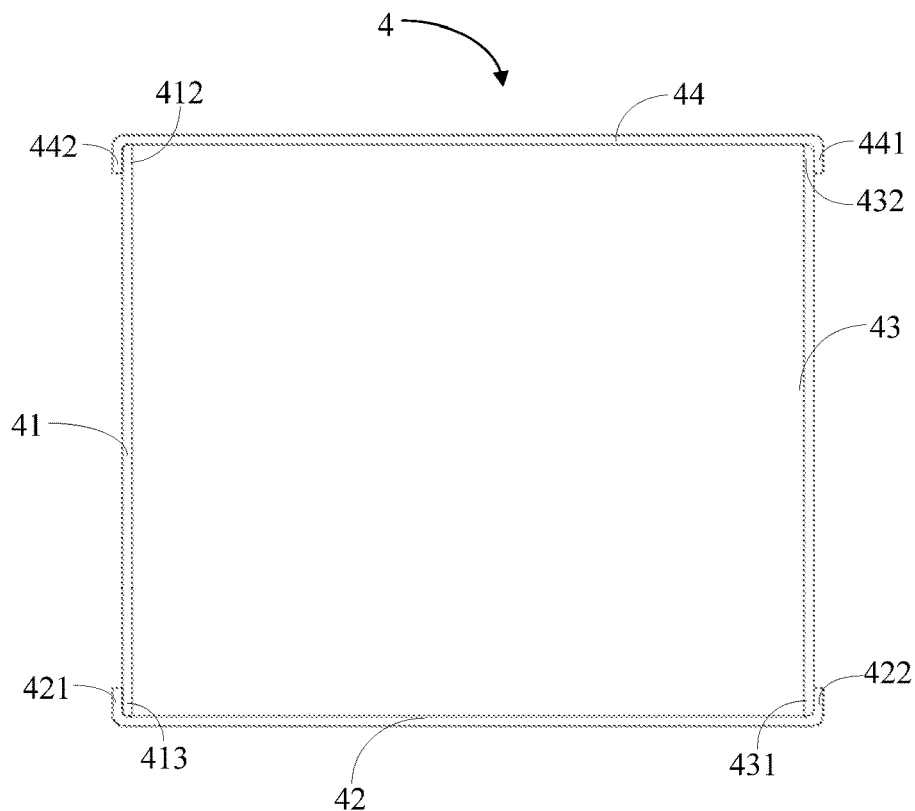
FIG. 43A is a schematic structural view of a casing according to an exemplary embodiment of the present application.

As shown in FIG. 43A, the casing structure is formed by splicing four mutually independent side walls. Wherein one side edge 412 of the first side wall 41 and one side edge 442 of the fourth side wall 44 are partially overlapped and welded. The other side edge 413 of the first side wall 41 and one side edge 421 of the second side wall 42 are partially overlapped and welded. The other side edge 422 of the second side wall 42 and one side edge 431 of the third side wall 43 are partially overlapped and welded. Moreover, the other side edge 432 of the third side wall 43 and the other side edge 441 of the fourth side wall 44 are partially overlapped and welded. Taking the overlapping welding of the side edges 412 and 442 as an example, the side edge 442 is bent to be welded to the outside of the side edge 412, and similar operations can be used for the welding of other overlapping parts.

Figure 43B:
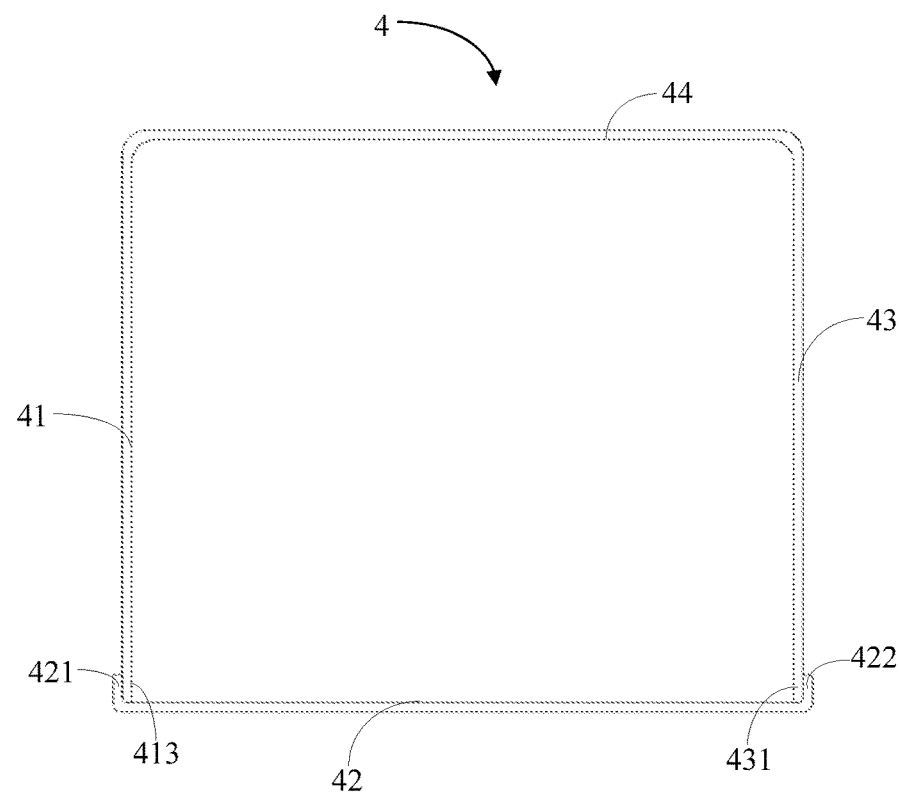
FIG. 43B is a schematic structural view of another casing according to an exemplary embodiment of the present application.
Figure 43C:
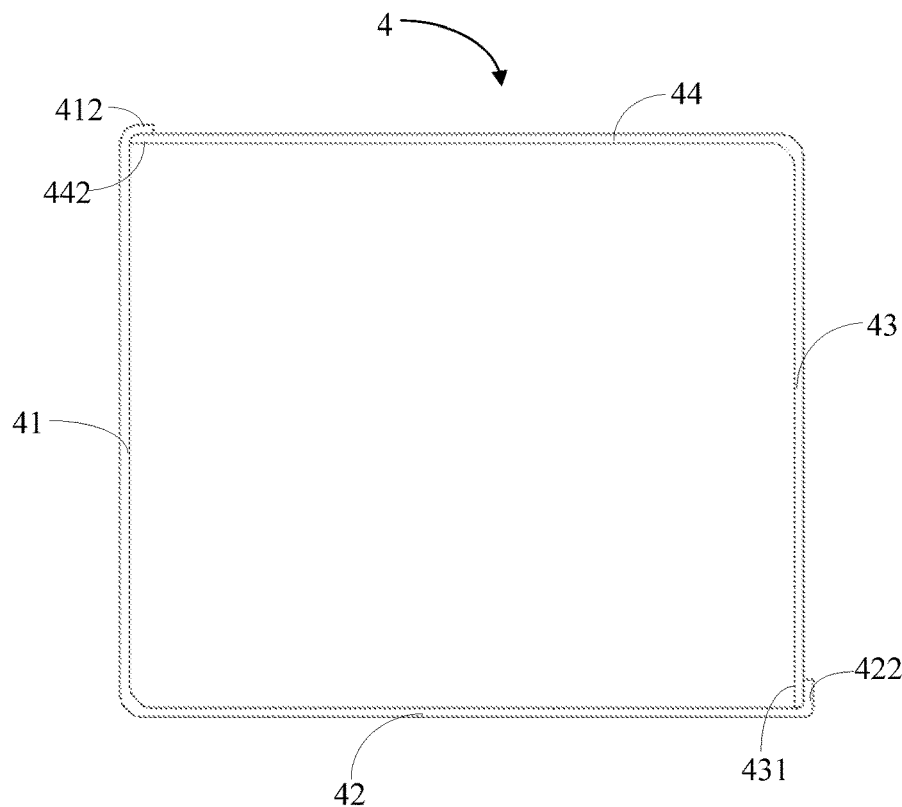
FIG. 43C is a schematic structural view of another casing according to an exemplary embodiment of the present application.
Figure 43D:
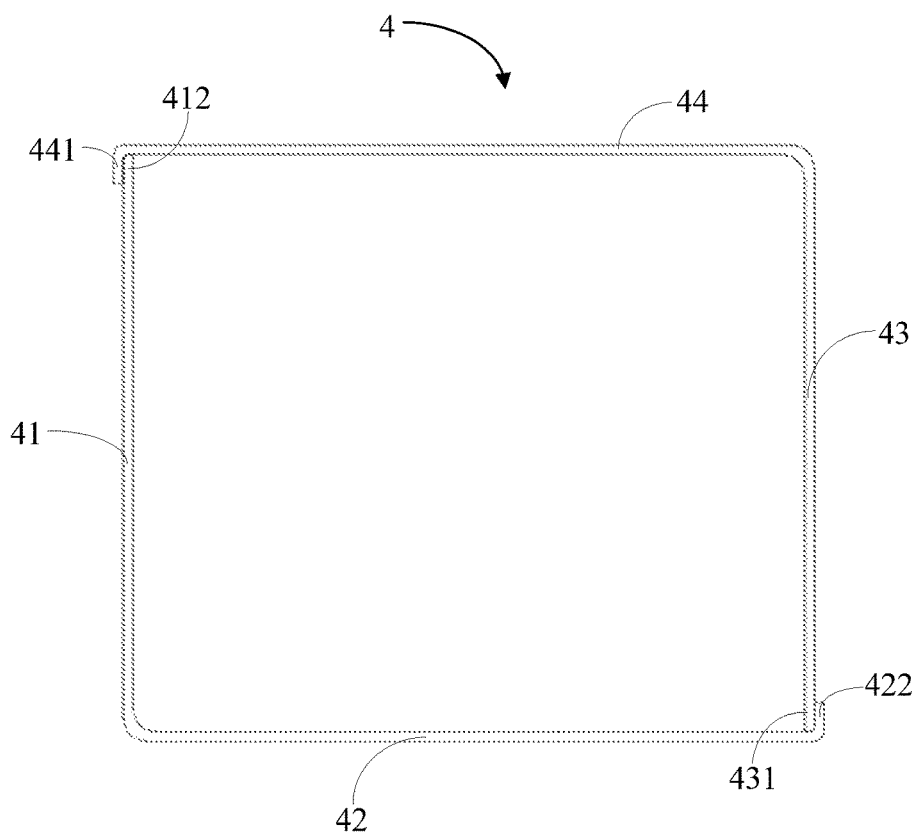
FIG. 43D is a schematic structural view of another casing according to an exemplary embodiment of the present application.
Figure 44:
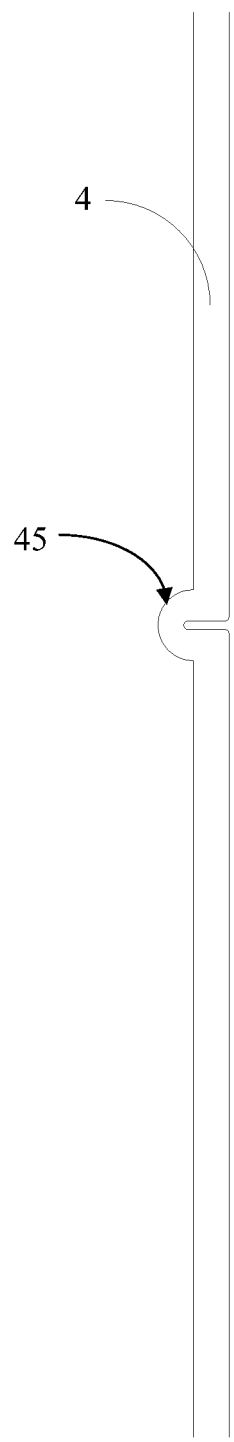
FIG. 44 is a schematic structural view of a pleated structure according to an exemplary embodiment of the present application.

As shown in the casing structure shown in FIGS. 43B to 43D, the casing 4 includes two plate members independent of each other, and the two plate members are connected by welding.

The first side wall 41, the fourth side wall 44 and the third side wall 43 shown in FIG. 43B are integrally formed. The side edges 421 and 422 are overlapped and welded with the side edges 413 and 431, respectively.

The first side wall 41 and the second side wall 42 shown in FIG. 43C are integrally formed. The third side wall 43 and the fourth side wall 44 are integrally formed. The side edges 412 and 422 are overlapped and welded with the side edges 442 and 431, respectively.

Similarly, the first side wall 41 and the second side wall 42 shown in FIG. 43D are integrally formed. The third side wall 43 and the fourth side wall 44 are integrally formed. The difference from FIG. 43C is that the casing 4 shown in FIG. 43D is formed by splicing the same two plates, which is beneficial for mass production and processing.

Further, along the length direction of the flat tube 30, the casing 4 is provided with a plurality of pleated structures 45 (refer to FIG. 30) to release the thermal stress generated during the heat exchange process and enhance the strength of the casing. The pleated structures 45 may extend substantially in the stacking direction of the flat tubes 30. Correspondingly, the pleated structures 45 are distributed on the opposite side walls 41 and 43. Of course, the pleated structure can also be distributed on the side walls 42 and 44. Alternatively, the plurality of pleated structures 45 are substantially evenly distributed. Of course, the plurality of pleated structures may be unevenly distributed.

The pleated structures 45 may be convex toward the outside of the casing (refer to FIG. 44), or may be convex toward the interior of the casing (not shown). This application does not limit to this.

Of course, the number of the pleated structure 45 may be only one. This application does not limit to this, which can be set according to specific application environment.

Of course, in some embodiments, the heat exchanger may not include a casing, in which the first heat exchange medium flowing through the flat tube exchanges heat with the outside air.

The above is only the preferred embodiments of the present application, and does not limit the present application in any form. Although the preferred embodiments of the present application have been disclosed above, they are not intended to limit the application. Any skilled person in the art, within the scope of not departing from the technical solutions of the present application, when the technical content disclosed above can be used to make some modifications or equivalent changes to the above embodiments by the technical essence of the application still fall within the scope of the technical solutions of the present application.

What is claimed is:

1. A heat exchanger, comprising:
   a casing comprising a first side wall, a second side wall, a third side wall and a fourth side wall, the first side wall being opposite to the third side wall, the second side wall being opposite to the fourth side wall, the first side wall, the second side wall, the third side wall and the fourth side wall being enclosed to form a chamber, the casing further comprising an inlet external pipe and an outlet external pipe which are in communication with the chamber, the inlet external pipe being configured for a second heat exchange medium to flow into the chamber, and the outlet external pipe being configured for the second heat exchange medium to flow out of the chamber;
   a core at least partially accommodated in the chamber, the core comprising flat tubes for circulating a first heat exchange medium; and a first header box comprising:
  a first bottom plate comprising a first surface and a second surface opposite to the first surface, the first bottom plate being of a one-piece configuration, the first surface being at least partially recessed inwardly to form at least one straight first hole which extends along a length direction of the first bottom plate, the second surface being at least partially recessed inwardly to form at least two straight second holes which extend along a width direction of the first bottom plate, and the length direction being perpendicular to the width direction;
  wherein the first hole is communicated with the at least two second holes, so that fluid flowing through the first hole is capable of being distributed to the at least two second holes, or fluid flowing through the second holes is capable of being collected to the first hole; and
  an unperforated cover plate which is connected to the first surface to block an opening of the first hole on the first surface;
  wherein the first header box comprises a second bottom plate, the first bottom plate is sandwiched by the cover plate and the second bottom plate, the second bottom plate defines a plurality of straight third holes in communication with the second holes, each third hole extends along the width direction, the plurality of third holes are separated from one another along the length direction;
  wherein the heat exchanger further comprises a second header box, and the first header box and the second header box are disposed at opposite ends of the casing, respectively; the second header box comprises:
    another cover plate provided with a plurality of grooves of which each extends along the length direction;
    a third plate connected to the another cover plate, the third plate defining a plurality of straight first hole portions which are separated from one another along the length direction, each first hole portion extending along the width direction; and
    a fourth plate connected to the third plate, the third plate being sandwiched by the another cover plate and the fourth plate, the fourth plate defining a plurality of straight second hole portions which are separated from one another along the length direction, each second hole portion extending along the width direction;
  wherein corresponding first hole portions and corresponding second hole portions are in communication with each other so as to form a plurality of fourth holes; and
  wherein one side of each flat tube is inserted into the third hole of the second bottom plate and another side of each flat tube is inserted into the fourth hole.

2. The heat exchanger according to claim 1, wherein a plurality of the first holes are provided, each of the first holes extends along the length direction of the first bottom plate, each adjacent two first holes are separated from each other along the width direction by a straight partition wall integrally formed with the first bottom plate, and the straight partition wall extends along the length direction and has a same length as each first hole along the length direction.

3. The heat exchanger according to claim 1, wherein the first bottom plate is thicker than any one of the cover plate and the second bottom plate along a thickness direction perpendicular to the length direction and the width direction.

4. The heat exchanger according to claim 1, wherein the another cover plate comprises a partition provided in the grooves to separate the grooves into a first chamber and a second chamber, the first chamber and the second chamber are not in direct communication with each other, the first chamber and the second chamber are distributed along the length direction, so that the flat tubes are divided into a first tube group which is in communication with the first chamber and an interior of the first header box, and a second tube group which is in communication with the second chamber and the interior of the first header box.

5. The heat exchanger according to claim 4, further comprising a first header fixed to one side of the second header box and a second header fixed to another side of the second header box, the first header comprising a first header hole in communication with the first chamber and a first inlet for the first heat exchange medium to flow into the first chamber, and the second header comprising a second header hole in communication with the second chamber and a first outlet for the first heat exchange medium to flow out of the second chamber.

6. The heat exchanger according to claim 5, wherein both the first header and the second header extend along the width direction, and both the inlet external pipe and an outlet external pipe extend along the length direction.

7. The heat exchanger according to claim 1, wherein the first side wall, the second side wall, the third side wall and the fourth side wall are integrally formed.

8. The heat exchanger according to claim 1, wherein the inlet external pipe is fixed to the third side wall, the outlet external pipe is fixed to the first side wall, and the inlet external pipe is located lower than the outlet external pipe so that the second heat exchange medium requires to overcome gravity when the second heat exchange medium flows from the inlet external pipe to the outlet external pipe.

9. A heat exchanger, comprising:
  a casing comprising a first side wall, a second side wall, a third side wall and a fourth side wall, the first side wall being opposite to the third side wall, the second side wall being opposite to the fourth side wall, the first side wall, the second side wall, the third side wall and the fourth side wall being enclosed to form a chamber, the casing further comprising an inlet external pipe and an outlet external pipe which are in communication with the chamber, the inlet external pipe being configured for a second heat exchange medium to flow into the chamber, and the outlet external pipe being configured for the second heat exchange medium to flow out of the chamber;
  a core at least partially accommodated in the chamber, the core comprising flat tubes for circulating a first heat exchange medium; and
  a first header box comprising:
    a first bottom plate comprising a first surface and a second surface opposite to the first surface, the first bottom plate being of a one-piece configuration, the first surface being at least partially recessed inwardly to form at least one straight first hole which extends along a length direction of the first bottom plate, the second surface being at least partially recessed inwardly to form at least two straight second holes which extend along a width direction of the first bottom plate, and the length direction being perpendicular to the width direction;

wherein the first hole is communicated with the at least two second holes, so that fluid flowing through the first hole is capable of being distributed to the at least two second holes, or fluid flowing through the second holes is capable of being collected to the first hole; and an unperforated cover plate which is connected to the first surface to block an opening of the first hole on the first surface;

wherein the core further comprises a heat dissipation member, the heat dissipation member having a first notch on a side adjacent to the inlet external pipe, a first inclined edge corresponding to the first notch, a second notch on another side adjacent to the outlet external pipe, and a second inclined edge corresponding to the second notch, the first notch and the second notch form a flow channel for circulation of the second heat exchange medium to reduce flow resistance to the second heat exchange medium;

wherein the heat dissipation member comprises a body portion, part of the body portion extends toward two ends so as to form a limiting portion, and the limiting portion abuts against the first header box;

wherein an end surface of the limiting portion is a straight edge, and a length L of the end surface is 5 mm to 10 mm.

10. The heat exchanger according to claim 9, wherein a height d of an end of the flow channel adjacent to the inlet external pipe or the outlet external pipe and a width D of the heat dissipation member meet condition: $1D \leq d \leq 0.25D$.

* * * * *